(12) United States Patent
Aoyama et al.

(10) Patent No.: US 8,401,311 B2
(45) Date of Patent: Mar. 19, 2013

(54) IMAGE PROCESSING DEVICE, METHOD, AND PROGRAM

(75) Inventors: Koji Aoyama, Saitama (JP); Hideki Watanabe, Saitama (JP); Hiroaki Yamajo, Tokyo (JP); Masuyoshi Kurokawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 953 days.

(21) Appl. No.: 12/400,936

(22) Filed: Mar. 10, 2009

(65) Prior Publication Data

US 2009/0232407 A1 Sep. 17, 2009

(30) Foreign Application Priority Data

Mar. 11, 2008 (JP) ................ P2008-061154

(51) Int. Cl.
*G06K 9/62* (2006.01)

(52) U.S. Cl. ......................................... 382/224

(58) Field of Classification Search .................. None
See application file for complete search history.

(56) References Cited

U.S. PATENT DOCUMENTS

| 6,748,113 | B1 | 6/2004 | Kondo et al. |
| 7,054,500 | B1 | 5/2006 | Lillevold |
| 2005/0249426 | A1 | 11/2005 | Badawy |
| 2007/0250893 | A1 | 10/2007 | Akiyama et al. |

FOREIGN PATENT DOCUMENTS

| EP | 0 859 518 A1 | 8/1998 |
| EP | 0 917 357 A1 | 5/1999 |
| EP | 1 641 270 A1 | 3/2006 |
| JP | 2001-204029 | 7/2001 |
| JP | 2005-012641 | 1/2005 |
| JP | 2005-079617 | 3/2005 |
| JP | 2006-157238 | 6/2006 |
| JP | 2007-266684 | 10/2007 |
| JP | 2007-281542 | 10/2007 |
| WO | WO 2005/004489 A1 | 1/2005 |

OTHER PUBLICATIONS

European Search Report issued on Aug. 6, 2012 for European Application No. 10 155 448.3.
European Search Report issued on Aug. 6, 2012 for European Application No. 09003496.8.
European Article 94(3) EPC issued Sep. 7, 2012 for European Application No. 10 155 448.3.
European Article 94(3) EPC issued Sep. 7, 2012 for European Application No. 09 003 496.8.
Puri, Atul, Chen, Xuemin, and Luthra, Ajay; "Video Coding Using the H.264/MPEG-4 AVC Compression Standard;" *Signal Processing Image Communication* 19 (2004) 793-849; 2004 Elsevier B.V.; available online at www.sciencedirect.com.
Japanese Office Action issued in Japanese Patent Application No. 2009-057940 on Jan. 24, 2013.

*Primary Examiner* — Chan S Park
*Assistant Examiner* — Elisa Rice
(74) *Attorney, Agent, or Firm* — Finnegan, Henderson, Farabow, Garrett & Dunner LLP.

(57) ABSTRACT

An image processing device includes: a step calculator configured to calculate, as a step, a difference in pixel values of pixels in a neighborhood with respect to each pixel in an image; a classifier configured to classify the pixels into classes for areas of the steps; a boundary ratio calculator configured to calculate, as a boundary ratio, a ratio of the number of pixels at a block boundary for each of the classes; and a block noise strength determinator configured to determine, as a block noise strength of the image, the step that is larger than a predetermined threshold and that is at a class having a largest value.

22 Claims, 21 Drawing Sheets

FIG. 17

| id | table |
|---:|---:|
| 0 | 0 |
| 1 | 4 |
| 2 | 8 |
| 3 | 12 |
| 4 | 16 |
| 5 | 20 |
| 6 | 24 |
| 7 | 28 |

FIG. 18

| id | b_hist | t_hist | b_hist / t_hist ×100 (%) | t_hist [id] / total ×100 (%) |
|---|---|---|---|---|
| 0 | 300 | 1000 | 30 | 54 |
| 1 | 150 | 400 | 38 | 22 |
| 2 | 45 | 200 | 23 | 11 |
| 3 | 18 | 110 | 16 | 6 |
| 4 | 15 | 50 | 30 | 3 |
| 5 | 10 | 60 | 17 | 3 |
| 6 | 2 | 20 | 10 | 1 |
| 7 | 1 | 10 | 10 | 1 |
| total | | 1840 | 0 | 100 |

IMAGE PROCESSING DEVICE, METHOD, AND PROGRAM

CROSS REFERENCES TO RELATED APPLICATIONS

The present invention contains subject matter related to Japanese Patent Application JP 2008-061154 filed in the Japanese Patent Office on Mar. 11, 2008, the entire contents of which are incorporated herein by reference.

BACKGROUND OF THE INVENTION

1. Field of the Invention

The present invention relates to image processing devices, methods, and programs. In particular, the present invention relates to an image processing device, a method, and a program that can measure block noise strength.

2. Description of the Related Art

During decoding of encoded image data, noise may be generated in the image to be decoded.

For example, when image data is to be compressed based on a compression system such as an MPEG (moving picture experts group) compression system, an encoder divides the image data into rectangular blocks containing multiple pixels and performs DCT (discrete cosine transform) processing on each of the divided blocks.

Thus, when a decoder decodes the image data encoded based on the MPEG system, the decoded image data, in principle, gives rise to steps in pixel values between pixels at boundary portions of blocks and thus makes it easier for block noise to be generated.

A device for reducing or eliminating such block noise is realized by, typically, using a known block size (e.g., 8 pixels×8 pixels in the case of MPEG2) and smoothing the block noise by using a LPF (low pass filter) on block boundary positions.

Such a simple method, however, has problems in that information of an image is lost by blurring or the like or other block distortion occurs as a result of performing smoothing on only the block boundaries.

The method further has problems in that the amount and the strength of block noise vary greatly depending on the contents of an image, compression coding conditions (e.g., a bitrate and a quantization scale), and so on. Thus, the use of one type of block-noise reduction processing has problems in that no reduction effect can be obtained for a high block noise strength and a reduction in the amount of image information in the presence of a very small amount of block noise can cause an adverse effect.

In order to prevent those problems, various devices and methods have been proposed.

However, image signals subjected to scaling (conversion of a resolution/conversion of the number of pixels) by video output devices, such as DVDs (digital versatile players), may be input to television receivers, and thus, it is desired to be capable of handing a block size that is different from the block size (e.g., 8 pixels×8 pixels) specified by the MPEG standard.

That is, some of such players may have an function for performing scaling, and may thus convert even a recorded signal having a SD (standard definition) resolution, such as a 720 pixels×480 pixels, into a signal having a HD (high definition) resolution with 1920 pixels×1080 pixels for output.

For HD recording signals, signals having a resolution of 1440 pixels×1080 pixels also exist, and such signals may be converted into a HD resolution of 1920 pixels×1080 pixels for output.

As described above, depending on influences of the scaling and a difference in a system (e.g., for analog input video or digital input video), the quality of signals digitally decoded may vary greatly (e.g., distortion may be large or small).

The quality of a decoded image varies greatly ranging from a low quality to a high quality, depending on a difference in an encoding system, conditions (such as and a bitrate) for compression and encoding, or the type of image. In particular, for an image that involves high-speed motion and an image that contains complicated image information even in a still image, distortion tends to increase.

For example, Japanese Unexamined Patent Application Publication Nos. 2001-204029 and 2007-281542 disclose technologies for effectively performing noise reduction processing on a high-quality image to a low-quality image by estimating the quality of a compressed, decoded image and dynamically switching the intensity of the noise reduction processing.

SUMMARY OF THE INVENTION

Technologies as described in Japanese Unexamined Patent Application Publication Nos. 2001-204029 and 2007-281542 are effectively used for cases in which compressing coding information can be obtained. However, in particular, television receivers may not obtain compression coding information, since images from external equipment may be input thereto, and it has been difficult for such technologies to dynamically perform control.

In view of the foregoing situation, it is desired to make it possible to adaptively reduce block noise in an input image by allowing block noise strengths to be statistically measured from an entire image to be decoded and allowing the strength for block noise reduction processing to be dynamically changed in accordance with the measured block noise strength.

According to an embodiment of the present invention, there is provided an image processing device. The image processing device includes: step calculating means for calculating, as a step, a difference in pixel values of pixels in a neighborhood with respect to each pixel in an image; classifying means for classifying the pixels into classes for areas of the steps; boundary ratio calculating means for calculating, as a boundary ratio, a ratio of the number of pixels at a block boundary for each of the classes; and block noise strength determining means for determining, as a block noise strength of the image, the step that is larger than a predetermined threshold and that is at a class having a largest value.

The image processing device may further includes stabilizing means for correcting and stabilizing, when the image is a moving image, the block noise strength of a current image containing a pixel of interest in accordance with a block noise strength of an image that is close in time.

The step calculating means may calculate, as a difference value of a pixel of interest, a value of a difference between an absolute value of a difference in pixel values between the pixel of interest and a reference pixel in a neighborhood of the pixel of interest and an absolute value of a difference in pixel values between a neighborhood pixel in a neighborhood of the pixel of interest and a reference pixel in a neighborhood of the neighborhood pixel, and when the difference value of the pixel of interest is larger than a predetermined value, the step calculating means may set the difference value of the pixel of interest as the step of the pixel of interest.

The step calculating means may further include storing means for storing multiple pieces of information of values of the differences of the pixels of interest. When the difference value of the pixel of interest is a largest one of the difference values of the pixels of interest, the difference values being stored by the storing means, the step calculating means may set the difference value of the pixel of interest as the step of the pixel of interest.

The step calculating means may change the reference pixel on a basis of a block size.

A position of the block boundary may be calculated based on information expressed by a scaling initial position and a scaling ratio for a reference block size.

The boundary ratio calculating means may calculate the ratio of the number of pixels at the block boundary for each of the classes in ascending order of corresponding steps.

The image processing device may further include: total ratio calculating means for calculating, as a total ratio, a ratio for each of the classes relative to the pixels of the entire image. When the total ratio is smaller than another predetermined threshold that is smaller than the predetermined threshold, the boundary ratio calculating means may suspend the calculation of the total ratio of a larger class of a corresponding step than the class.

According to an embodiment of the present invention, there is provided an image processing method. The image processing method includes the steps of: calculating, as a step, a difference in pixel values of pixels in a neighborhood with respect to each pixel in an image; classifying the pixels into classes for areas of the steps; calculating, as a boundary ratio, a ratio of the number of pixels at a block boundary for each of the classes; and determining, as a block noise strength of the image, the step that is larger than a predetermined threshold and that is at a class having a largest value.

According to an embodiment of the present invention, there is provided a program for causing a computer to execute processing including the steps of: calculating, as a step, a difference in pixel values of pixels in a neighborhood with respect to each pixel in an image; classifying the pixels into classes for areas of the steps; calculating, as a boundary ratio, a ratio of the number of pixels at a block boundary for each of the classes; and determining, as a block noise strength of the image, the step that is larger than a predetermined threshold and that is at a class having a largest value.

According to the embodiments of the present invention, a difference in pixel values of pixels in a neighborhood is calculated as a step with respect to each pixel in an image; the pixels are classified into classes for areas of the steps; a ratio of the number of pixels at a block boundary are calculated as a boundary ratio for each of the classes; and the step that is larger than a predetermined threshold and that is at a class having a largest value is determined as a block noise strength of the image.

According to one embodiment of the present invention, it is possible to measure the strength of block noise generated during decoding of encoded image data.

BRIEF DESCRIPTION OF THE DRAWINGS

FIG. 17 is a table illustrating the statistics processing;

FIG. 18 is a table illustrating the statistics processing;

DESCRIPTION OF THE PREFERRED EMBODIMENTS

Figure 1:
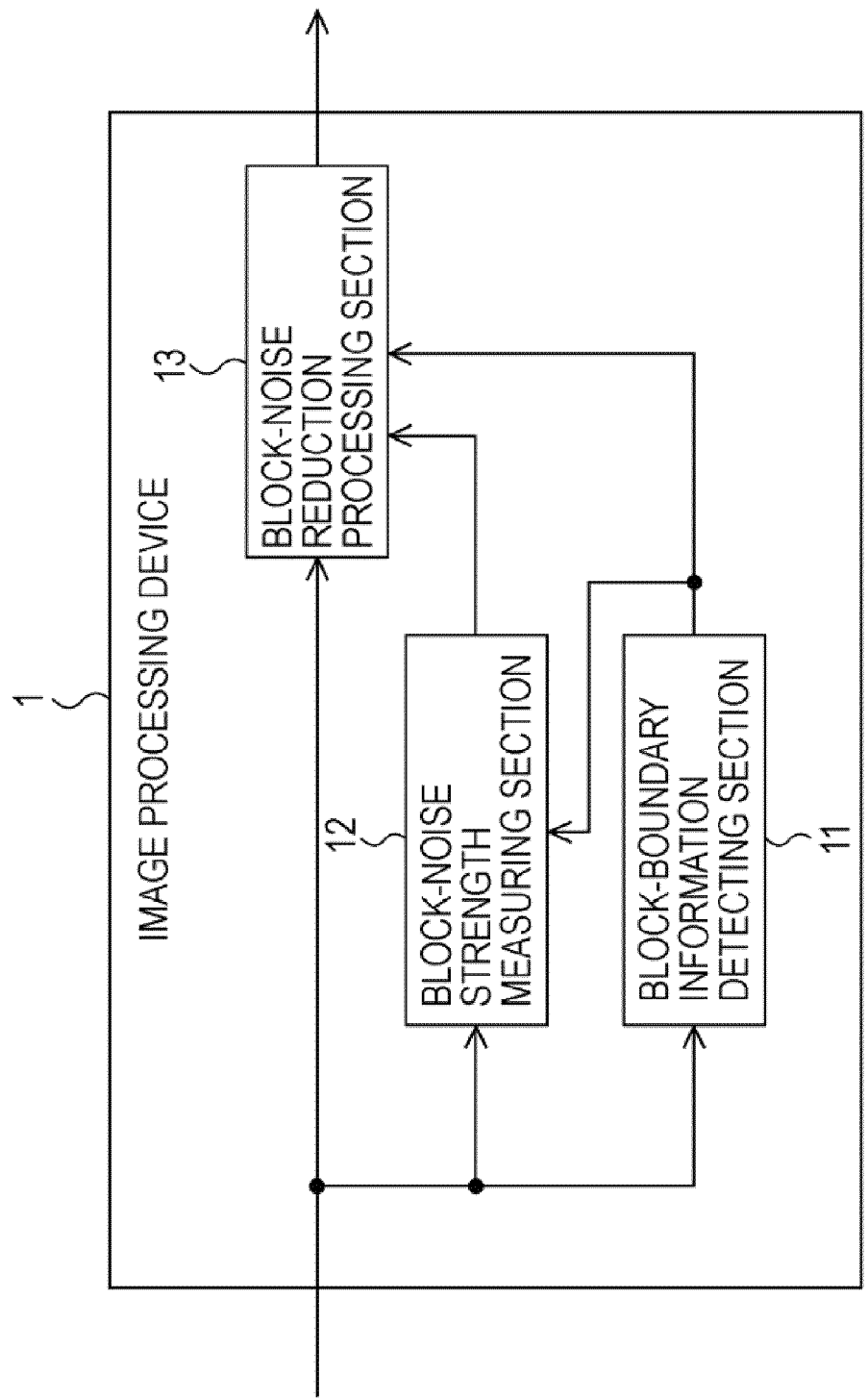
FIG. 1 is a diagram illustrating an example of the configuration of an image processing device according to an embodiment of the present invention.

FIG. 1 is a block diagram showing an example of the configuration of an image processing device according to an embodiment of the present invention.

An image processing device 1 shown in FIG. 1 includes a block-boundary information detecting section 11, a block-noise strength measuring section 12, and a block-noise reduction processing section 13. The image processing device 1 controls strength of noise reduction processing for a block boundary, on the basis of strength of block noise of an input image, and outputs an image having reduced block noise.

Images input to the image processing device 1 include images read from a storage medium, such as a DVD (digital versatile disc) or a HDD (hard disk drive), decoded, and output by a player or the like. Some types of player have an image enlarging function and can convert recorded image data having a SD (standard definition) resolution, such as a resolution of 720 pixels×480 pixels, into data having an a HD (high definition) resolution, such as a resolution of 1920 pixels×1080 pixels, for output. When recording signals are HD signals, signals having a resolution of 1440 pixels×1080 pixels may also be used, and some types of player can convert image data of an image having 1440 pixels×1080 pixels into an image having a HD resolution of 1920 pixels×1080 pixels for output.

Thus, the image input to the image processing device 1 may be an image obtained by performing resolution conversion (scaling) on image data resulting from analog-to-digital conversion on analog signals, image data based on digital signals, or analog signals or original image data having a resolution as described above.

The block-boundary information detecting section 11 detects a block size and a block boundary position from the input image. The block size is a unit of a pre-decoded, encoded block size subjected to DCT (discrete cosine transform) processing. The block-boundary information detecting section 11 supplies information of the block size and information of the block boundary position to the block-noise strength measuring section 12 and the block-noise reduction processing section 13. When the block size and the block boundary position are known in advance by means of communication with a decoder or the like, the block-boundary information detecting section 11 selects the known block size information and the known block boundary position information without performing the detection and supplies the block size information and the block boundary position information to the block-noise reduction processing section 13.

On the basis of the block size information and the block boundary position information supplied from the block-boundary information detecting section 11, the block-noise strength measuring section 12 measures the strength of block noise in the input image and supplies information of the measured block noise strength to the block-noise reduction processing section 13.

On the basis of the block size information and the block boundary position information supplied from the block-boundary information detecting section 11 and the block noise strength information supplied from the block-noise strength measuring section 12, the block-noise reduction processing section 13 reduces the block noise in the input image by adaptively varying the strength of the block-noise reduction processing and outputs an image having reduced noise.

Figure 2:
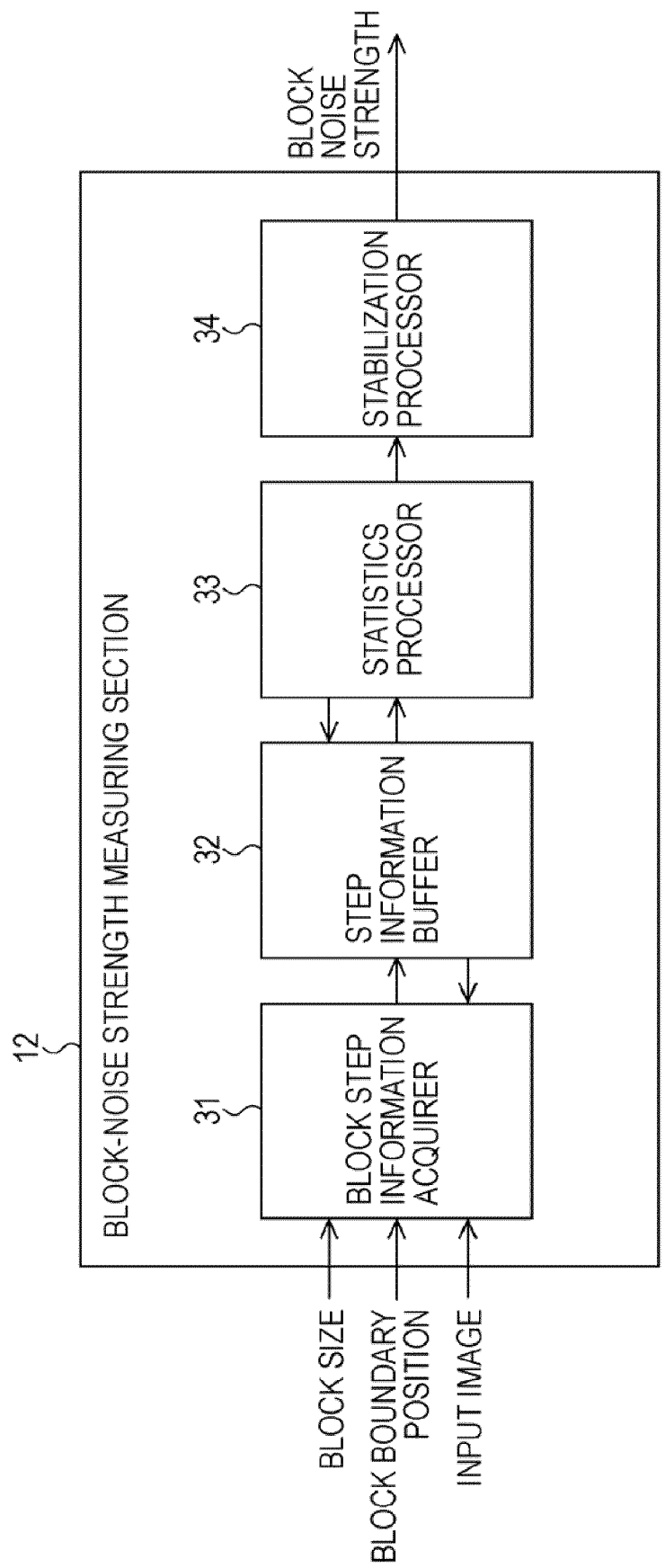
FIG. 2 is a diagram illustrating an example of the configuration of a block-noise strength measuring section shown in FIG. 1.

An example of the configuration of the block-noise strength measuring section 12 in the present embodiment will now be described with reference to FIG. 2.

On the basis of the block size and the block boundary position, the block step information acquirer 31 determines the absolute value of a difference in pixel values between a pixel of interest, the pixel being each pixel of the input image, and a reference pixel for the pixel of interest, and compares the absolute value with a value of a neighborhood pixel to determine whether or not a step is generated. The block step information acquirer 31 then stores the absolute value of the difference in a step information buffer 32 as step information.

A statistics processor 33 statistically processes the step information, stored in the step information buffer 32, to calculate the strength of block noise in the input image, and supplies the calculated block noise strength to a stabilization processor 34.

The stabilization processor 34 calculates a direction of change, on the basis of the block noise strength information of the input image and the block noise strength information of a previous input image. In accordance with the direction of change, the stabilization processor 34 performs correction so as to stabilize the block noise strength of the input image and supplies a result correction to the block-noise reduction processing section 13 as a block noise strength.

Figure 3:
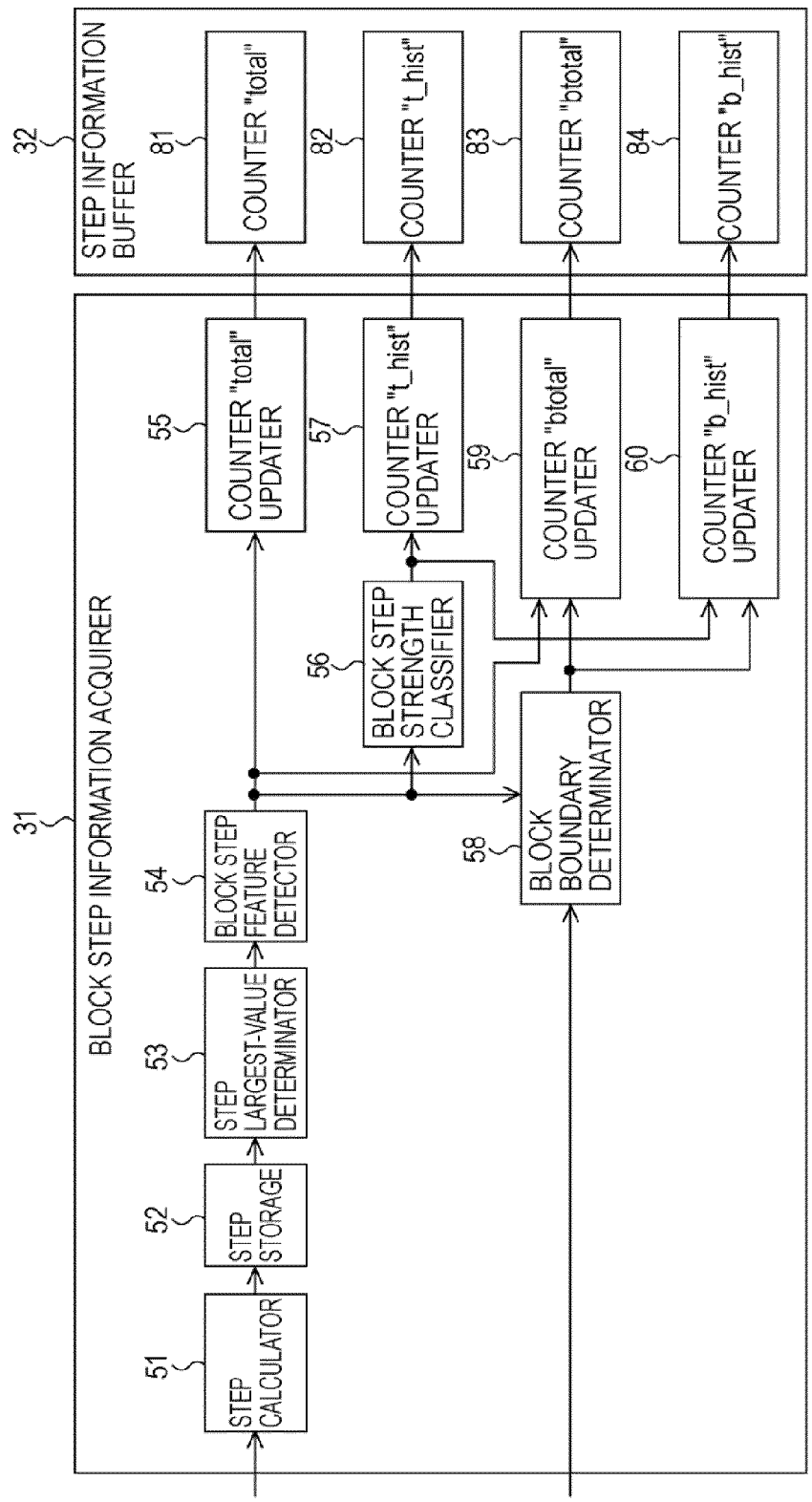
FIG. 3 is a diagram illustrating an example of the configuration of a block step information acquirer shown in FIG. 2.

An example of the configuration of the block step information acquirer 31 in the present embodiment of the present invention will now be described with reference to FIG. 3.

With respect to a pixel of interest and its neighborhood reference pixels in the input image, a step calculator 51 calculates, as a step, the absolute value of a difference in pixel values between the adjacent pixels thereof, and stores a calculation result in a step storage 52.

On the basis of the step information stored in the step storage 52, a step largest-value determinator 53 determines whether or not the absolute value of the difference in the pixel values between the adjacent pixels of the pixel of interest in the input image is the largest value of the values of the absolute values of differences in pixel values between adjacent pixels of the reference pixels. When the absolute value in question is the largest value, the step largest-value determinator 53 supplies the step to a block step feature detector 54, as a block boundary step. When the absolute value in question is not the largest value, the step largest-value determinator 53 issues, to the block step feature detector 54, a notification indicating that the supplied step is 0 and is not a block boundary step.

When the supplied step is larger than 0, the block step feature detector 54 supplies, as a block step, the step to a counter "total" updater 55, a block step strength classifier 56, a block boundary determinator 58, and a counter "btotal" updater 59. When the supplied step is not larger than 0, the block step feature detector 54 supplies, as a "0" block step, the step to the counter "total" updater 55, the block step strength classifier 56, the block boundary determinator 58, and the counter "btotal" updater 59.

Upon receiving the block step from the block step feature detector 54, the counter "total" updater 55 performs an update by incrementing a block-noise-strength total-number counter "total" 81, stored in the step information buffer 32, by 1. That is, the block noise strength total counter "total" 81 counts the total number of processed pixels.

On the basis of the information of the block step, the block step strength classifier 56 classifies the strength of the block step into a class corresponding to the block noise strength set for a coefficient "id" for each predetermined area, and supplies the class to the counter "t_hist" updater 57 and a counter "b_hist" updater 60. The class for each id will hereinafter be referred to as a strength class "id".

The counter "t_hist" updater 57 increments a counter "t_hist" 82 in the step information buffer 32, for each class set with id based on the block step strength supplied from the block step strength classifier 56. That is, the counter "t_hist" 82 is set with an arrangement for each "id". That is, the counter "t_hist" 82 is constituted by multiple counters "t_hist [id]" set for respective strength classes "id", to count the number of pixels classified for each strength "id". The counter "t_hist" 82 may also hereinafter be referred to as a counter "t_hist[id]" 82 for each id.

On the basis of the block boundary position information, the block boundary determinator 58 determines whether or not the position of a pixel corresponding to the block step supplied from the block step feature detector 54 is a block boundary position. The block boundary determinator 58 then supplies a determination result to the counter "btotal" updater 59 and the counter "b_hist" updater 60.

When information of the block step supplied from the block step feature detector 54 is obtained and information indicating that the pixel position corresponding to the obtained block step is a block boundary position is supplied from the block boundary determinator 58, the counter "btotal" updater 59 performs an update by incrementing a counter "btotal" 83, stored in the step information buffer 32, by 1.

When the strength class "id" supplied from the block step strength classifier 56 is obtained and information indicating that the pixel position corresponding to the obtained strength class "id" is a block boundary position is supplied from the block boundary determinator 58, the counter "b_hist" updater 60 performs an update by incrementing a counter "b_hist" 84, stored in the step information buffer 32, by 1. That is, the counter "b_hist" 82 is constituted by multiple counters "b_hist[id]" set for respective strength classes "id" of pixels belonging to the block boundary position, and counts, of the pixels belonging to the block boundary position, the number of pixels classified for each strength "id". The counter "b_hist" 84 may also hereinafter be referred to as a "counter "b_hist"[id] 84" for each id.

Figure 4:
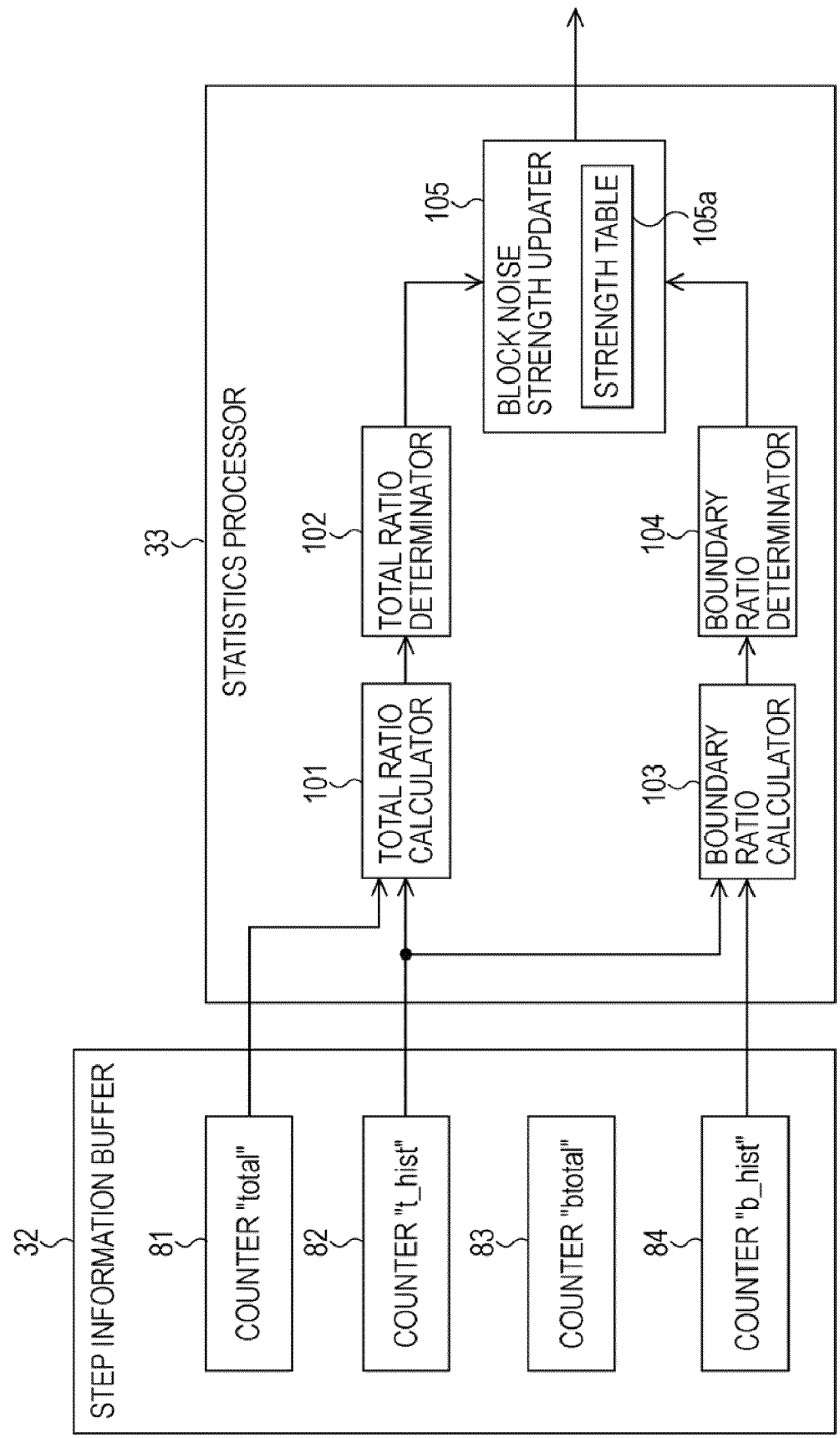
FIG. 4 is a diagram illustrating an example of the configuration of a statistics processor shown in FIG. 2.

An example of a detailed configuration of the statistics processor 33 will now be described with reference to FIG. 4.

A total ratio calculator 101 calculates, as a total ratio, a ratio of the counter t_hist[id] 82 for each strength class "id" corresponding to the size of the block strep to the counter "total" 81 indicating the total number of pixels belonging to the detection area and supplies the total ratio to the total ratio determinator 102.

The total ratio determinator 102 compares the total ratio for each strength class "id" with a predetermined value and supplies a comparison result to the block noise strength updater 105.

A total ratio calculator 103 calculates, as a boundary ratio, a ratio of the counter b_hist[id] 84 for each strength class "id" for the size of the block strep at the block boundary to the counter t_hist[id] 82 and supplies the boundary ratio to the boundary ratio determinator 104.

The boundary ratio determinator 104 compares the boundary ratio supplied from the boundary ratio calculator 103 with a predetermined value and supplies a comparison result to the block noise strength updater 105.

On the basis of the determination results of the total ratio determinator 102 and the boundary ratio determinator 104, the block noise strength updater 105 updates, as a block noise strength for each frame, a strength that is contained in a table 105a and that corresponds to the result for each statistically determined strength class "id".

Figure 5:
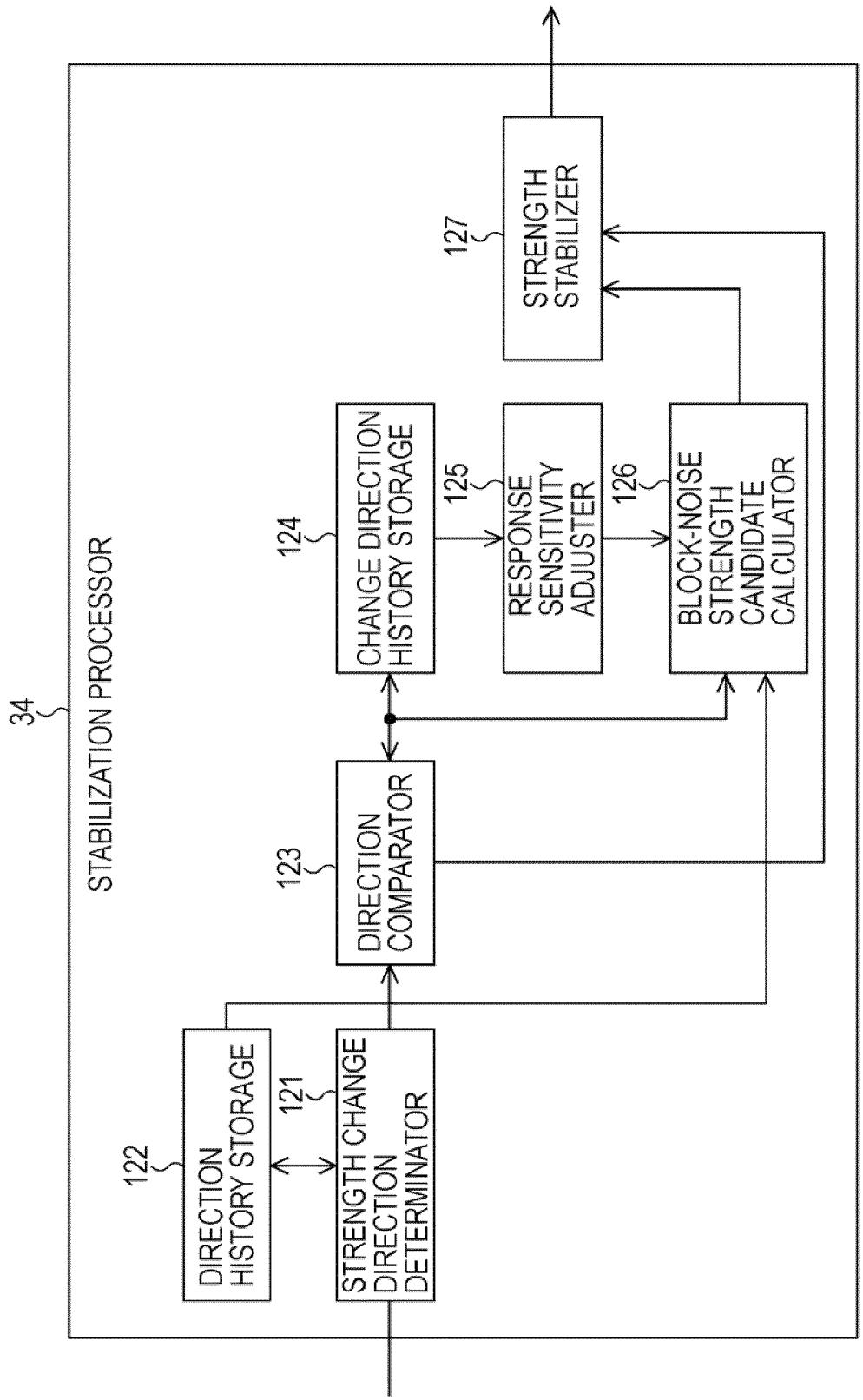
FIG. 5 is a diagram illustrating an example of the configuration of a stabilization processor shown in FIG. 2.

An example of a detailed configuration of the stabilization processor 34 will now be described with reference to FIG. 5.

On the basis of the block noise strength of a previous frame, the block noise strength being stored in a direction history storage 122, and the block noise strength of the current frame, a strength-change direction determinator 121 calculates a direction of change in the strength and supplies the calculated direction of change to a change comparator 123. The strength-change direction determinator 121 also stores the block noise strength of the current frame in the direction history storage 122.

The direction comparator 123 compares the strength change direction supplied from the strength-change direction determinator 121 with a strength change direction of the previous frame, the strength change direction being stored in a change direction history storage 124, to determine whether or not the strength change direction has changed. In accordance with a determination result, the direction comparator 123 supplies information of the strength change direction to the change direction history storage 124 and a block-noise strength candidate calculator 126 or a strength stabilizer 127.

The change direction history storage 124 sequentially stores information of cumulative strength change directions as history.

On the basis of the information of the cumulative strength change directions stored in the change direction history storage 124, a response sensitivity adjuster 125 calculates an adjusted strength change direction by using a predetermined conversion function and supplies the adjusted strength change direction to the block-noise strength candidate calculator 126.

On the basis of the previous block noise strength and the adjusted strength change direction, the block-noise strength candidate calculator 126 calculates a block-noise strength candidate of the block noise strength of the frame that is currently processed and supplies the block noise strength candidate to the strength stabilizer 127.

On the basis of the block-noise strength candidate supplied from the block-noise strength candidate calculator 126 and the strength change direction information of the previous frame, the strength change direction being stored in the direction history storage 122, the strength stabilizer 127 determines the block noise strength of the current frame while stabilizing the block noise strength so as to correspond to a change in the block noise strength of the current frame, and outputs information of the determined block noise strength of the current frame.

Figure 6:
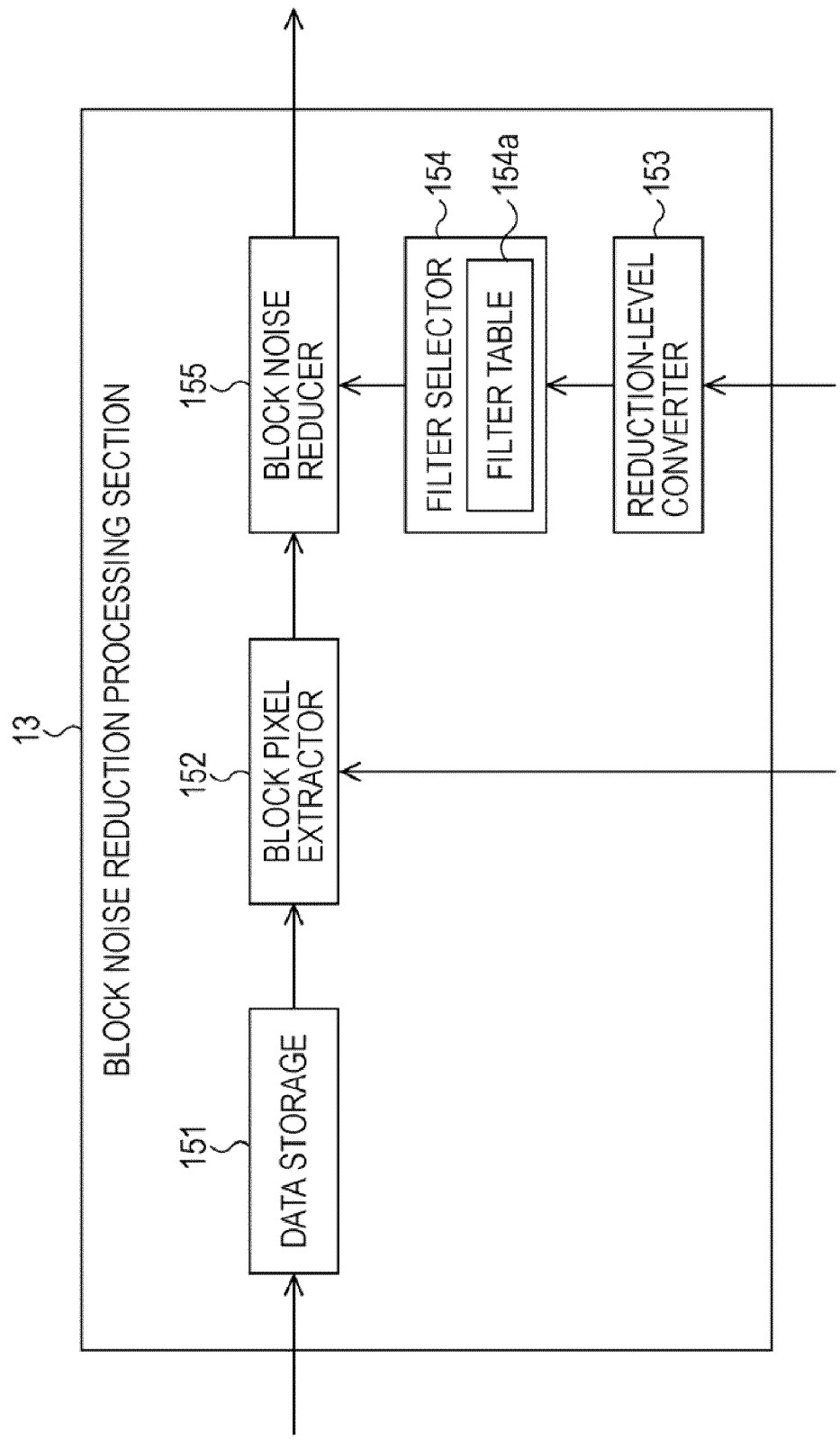
FIG. 6 is a diagram illustrating an example of the configuration of a block-noise reduction processing section shown in FIG. 1.

An example of a detailed configuration of the block-noise reduction processing section 13 will now be described with reference to FIG. 6.

A data storage 151 stores information of pixel values of all pixels for the input image and supplies the information of the pixel values to a block pixel extractor 152, as appropriate.

The block pixel extractor 152 reads, for each block, the pixels from the data storage 151 on the basis of the block boundary position information and supplies the read pixels to a block noise reducer 155.

In accordance with the information of the statistically determined block noise strength of the current frame, the information being supplied from the block-noise strength measuring section 12, the reduction-level converter 153 selects a reduction level indicating the strength of the block-noise reduction processing, and supplies the reduction level to a filter selector 154.

In accordance with the reduction level, the filter selector 154 selects one of filters for the block-noise reduction processing, the filters being stored in a filter table 154a, and supplies information of the selected filter to the block noise reducer 155.

Using the filter supplied from the filter selector 154, the block noise reducer 155 performs, for each block, filter processing on pixels supplied from the block pixel extractor 152, to thereby reduce the block noise.

Figure 7:
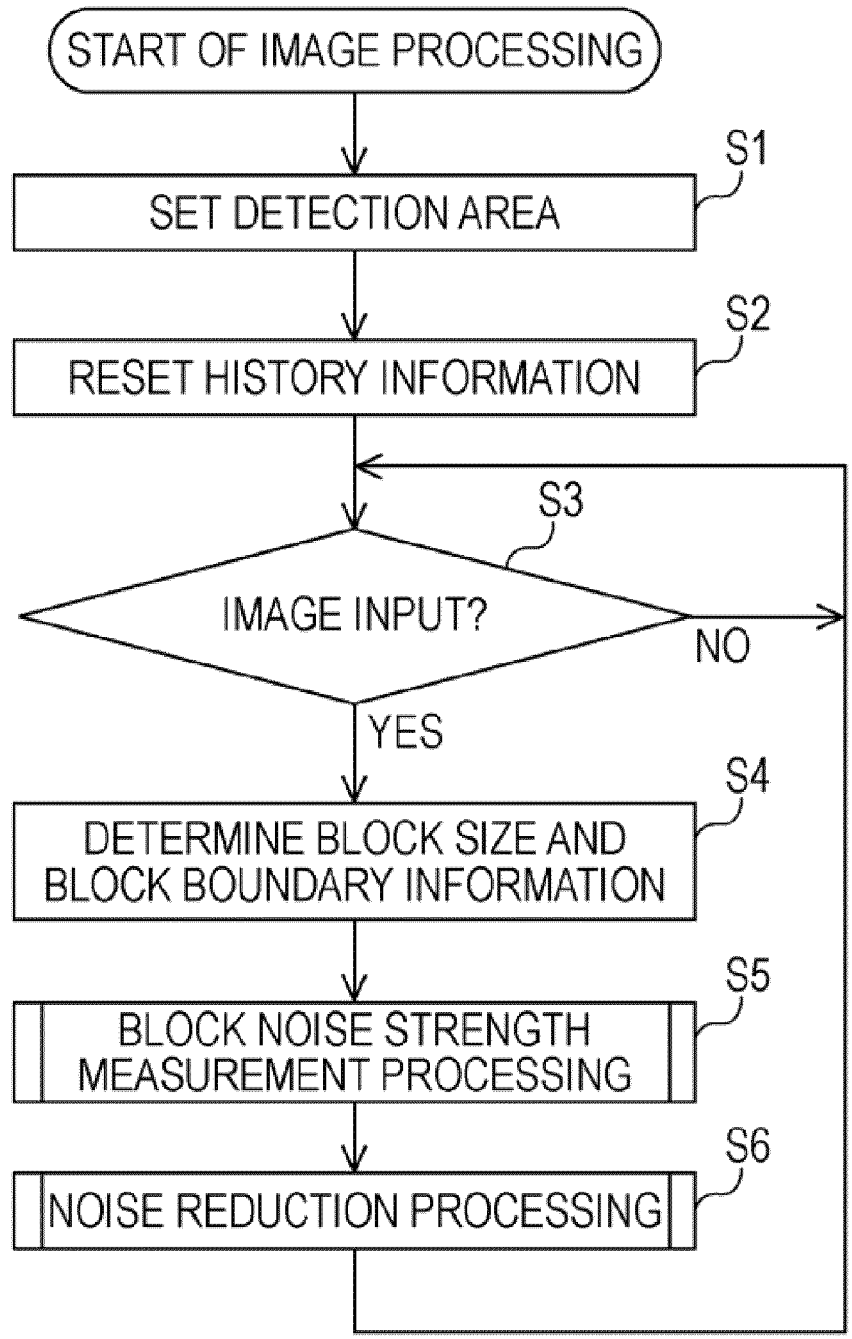
FIG. 7 is a flowchart illustrating image processing.

Image processing performed by the image processing device 1 will now be described with reference to a flowchart shown in FIG. 7.

Figure 8:
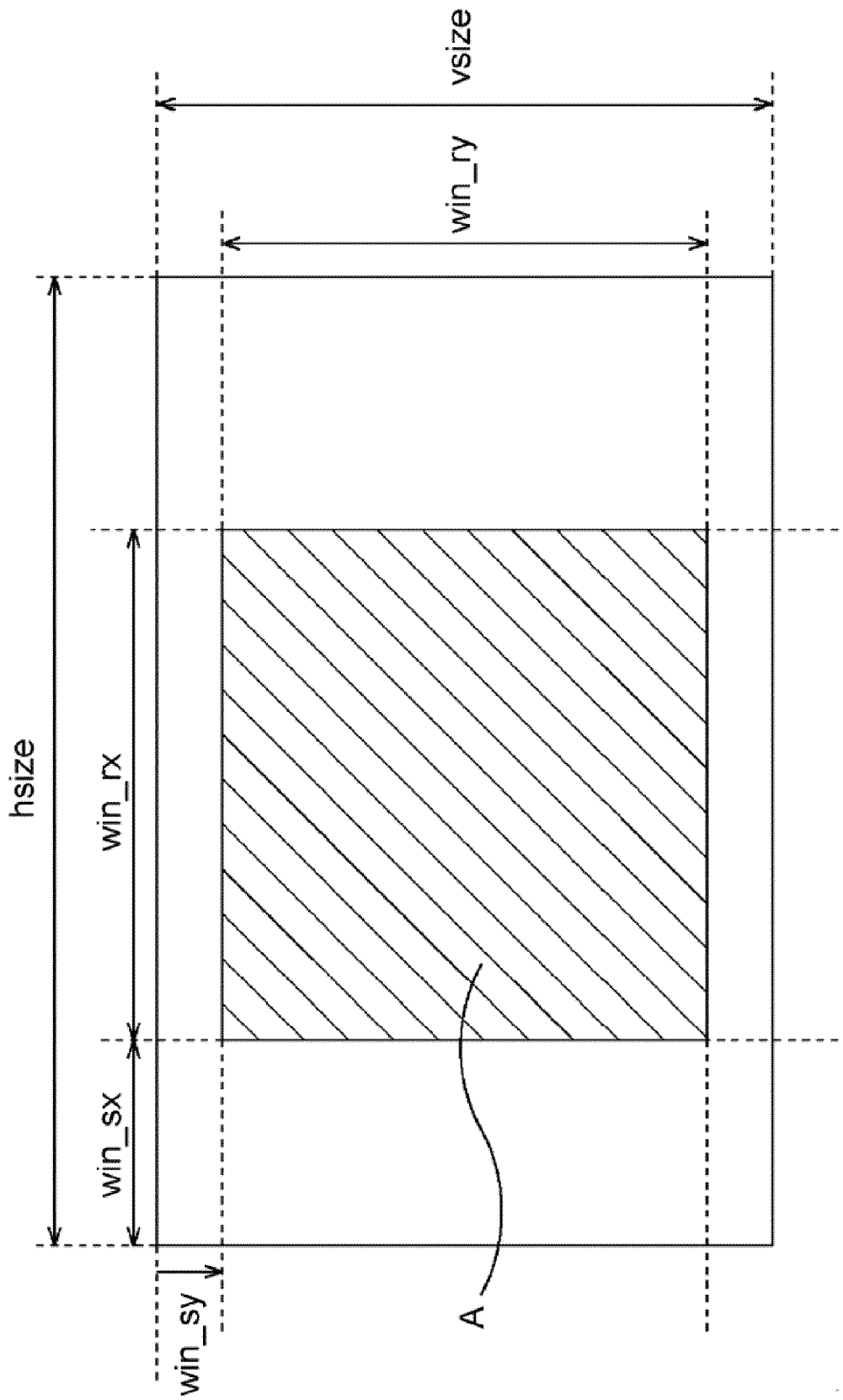
FIG. 8 is a diagram illustrating a detection area in the image processing.

In step S1, the image processing device 1 sets a detection area for detecting the strength of block noise in an input image. The detection area can be freely set. For determination of the strength of block noise for each frame, a most appropriate image is highly likely to be read from an area in the vicinity of the frame center where distortion is small relative to an angle of view. Thus, when the size of the input image is expressed by hsize (pixels)×vsize (pixels) in horizontal and vertical directions, as shown in FIG. 8, the image processing device 1 sets a detection area A defined by win_rx in the horizontal direction and win_ry in the vertical direction. Multiple detection areas may be set so that the strengths of block noises in the respective areas are detected.

In step S2, the image processing device 1 resets history information in the direction history storage 122 in the stabilization processor 34.

In step S3, the image processing device 1 determines whether or not an image is input. When an image is input, the process proceeds to step S4 in which the block-boundary information detecting section 11 detects information of a block size and information of a block boundary position from the input image, and supplies a detection result, i.e., the information of the block size and the information of the block boundary position, to the block-noise strength measuring section 12 and the block-noise reduction processing section 13. The information of the block size and the information of the block boundary position may be information pre-supplied together with the data of the input image.

In step S5, the block-noise strength measuring section 12 executes block-noise strength measurement processing to measure a block noise strength for each frame and supplies a measurement result, i.e., information of the block noise strength for each frame, to the block-noise reduction processing section 13.

Figure 9:
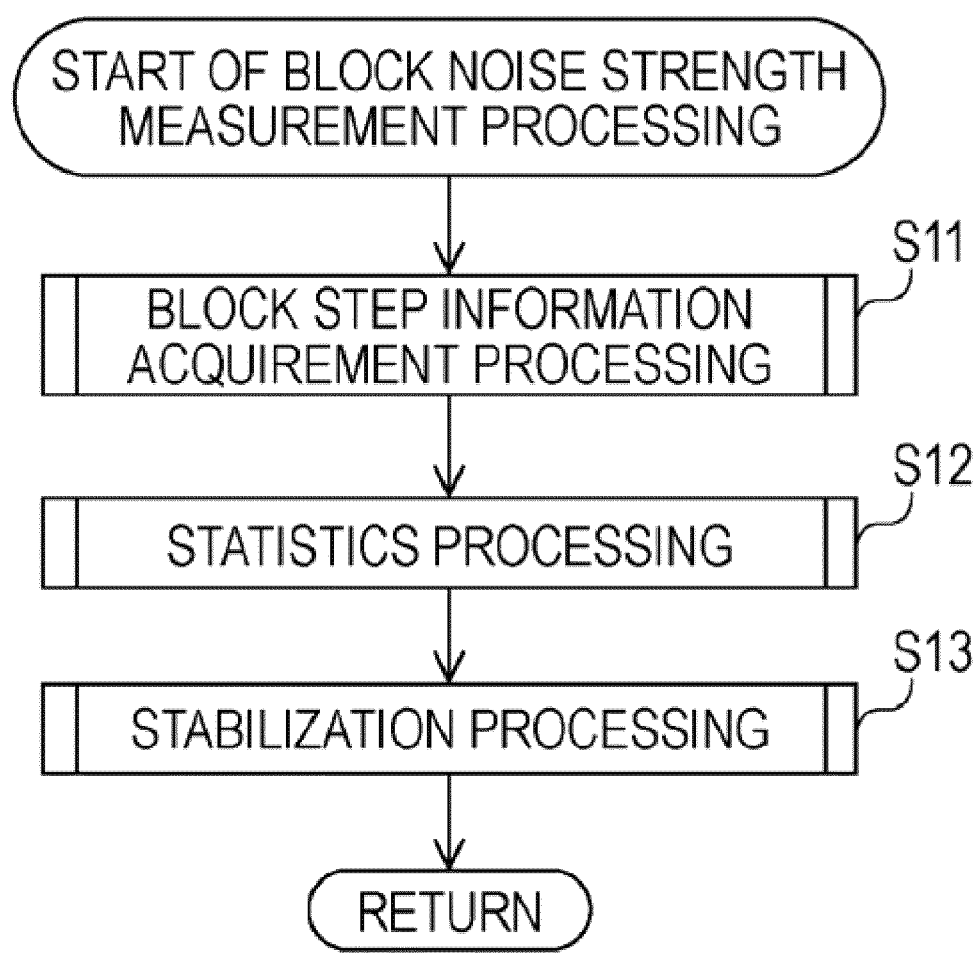
FIG. 9 is a flowchart illustrating block noise strength measurement processing.

The block noise strength measurement processing performed by the block-noise strength measuring section 12 shown in FIG. 2 will now be described with reference to a flowchart shown in FIG. 9.

In step S11, the block step information acquirer 31 executes block-step information acquirement processing to acquire block step information for each block and stores the block step information in the step information buffer 32.

Figure 10:
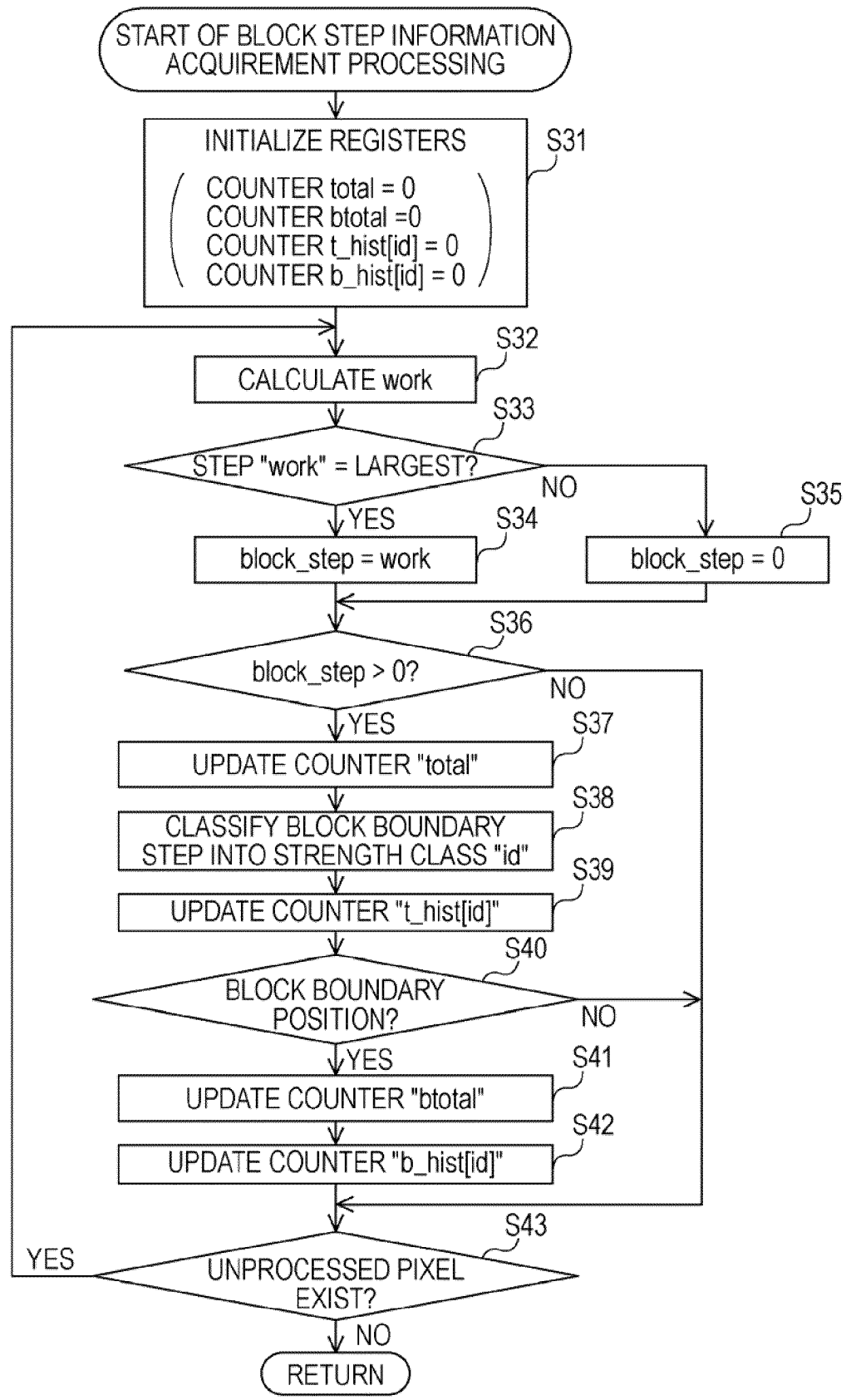
FIG. 10 is a flowchart illustrating block step information acquirement processing.

The block step information acquirement processing performed by the block step information acquirer 31 shown in FIG. 3 will now be described with reference to a flowchart shown in FIG. 10.

In step S31, the block step information acquirer 31 initializes the counter "total" 81, the counter "btotal" 83, the counter "t_hist[id]" 82, and the counter "b_hist" 84, which are stored in the step information buffer 32 as registers.

In step S32, the step calculator 51 sets, as a pixel of interest, any of unprocessed pixels in the input image, calculates a step "work" with respect to each of reference pixels set for the pixel of interest, and stores a calculation result in the step storage 52.

Figure 11:
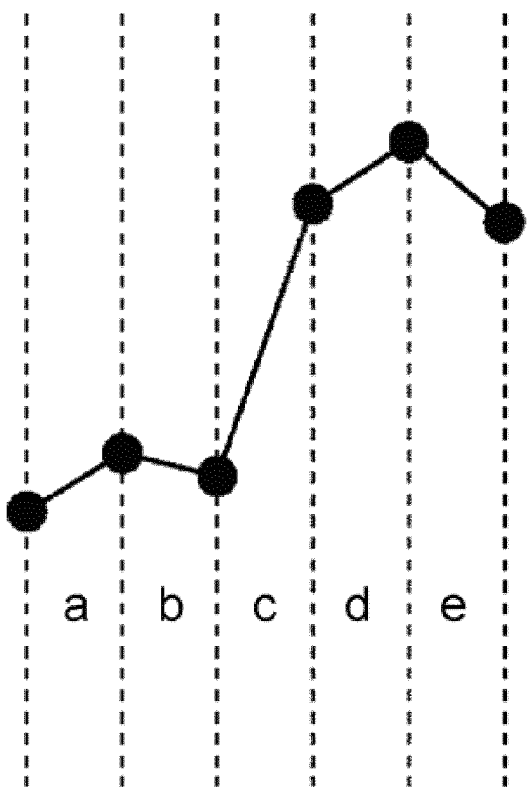
FIG. 11 illustrates the block step information acquirement processing.

It is now assumed that six pixels including two adjacent pixels at the right side of a pixel of interest and three adjacent pixels at the left side of the pixel of interest are used. In this case, when the pixel of interest is expressed as a pixel P[x] with the pixel of interest being at a coordinate position of x, as shown in FIG. 11, the two adjacent pixels at the right side are expressed as pixels P[x+1] and P[x+2] from the pixel closest to the pixel of interest and the three adjacent pixels at the left side are expressed as pixels P[x−1], P[x−2], and P[x−3] from the pixel closest to the pixel of interest. In this case, when the step calculator 51 performs calculation based on expression (1) below to calculate a step "work" of the pixel of interest. In FIG. 11, the horizontal axis indicates coordinates of horizontal pixels and the vertical axis indicates pixel values of the corresponding pixels. While processing in the horizontal direction is described in this case, it goes without saying that processing in the vertical direction may be performed.

$$work[x]=|P[x]-P[x-1]|-(|P[x-2]-P[x-3]|+|P[x-1]-P[x-2]|+|P[x+1]-P[x]|+|P[x+2]-P[x+1]|)/4 \quad (1)$$

where work[x] indicates the step of the pixel P[x] of interest, and P[x+1], P[x+2], P[x−1], P[x−2], and P[x−3] indicate the pixel values of P[x+1], P[x+2], P[x−1], P[x−2], and P[x−3], respectively.

That is, expression (1) yields a value obtained by subtracting the average value of the absolute values of the pixel values between the pixels P[x−3] and P[x−2], between the pixels P[x−2] and P[x−1], between the pixels P[x] and P[x+1], and between the pixels P[x+1] and P[x+2] from the absolute value of the difference in pixel values between the pixel P[x] of interest and the pixel P[x−1] at the left side thereof.

Thus, the step calculator 51 executes calculation that is similar to expression (1) described above to determine steps "work[x−3]", "work[x−2]", "work[x−1]", "work[x]", "work[x+1]", and "work[x+2]" as reference pixels with respect to the pixels P[x−3], P[x−2], P[x−1], P[x], P[x+1], and P[x+2], respectively. Although an example in which five pixels, namely, P[x−3], P[x−2], P[x−1], P[x+1], and P[x+2], are set as the reference pixels with respect to the pixel P[x] of interest, the number of pixels set as the reference pixels is not limited to five pixels and may be another number. However, when the number of pixels used as the reference pixels is larger than or equal to the block size (i.e., the pixels in the block), it becomes difficult to identify steps at a block boundary described below. Thus, it is desired that the number of pixels used as reference pixels be smaller than the sizes of left and right blocks, viewed from one block boundary.

In step S33, the step largest-value determinator 53 determines whether or not the step "work[x]" of the pixel of interest, the step "work[x]" being stored in the step storage 52, is the largest value of the steps "work[x−3]", "work[x−2]", "work[x−1]", "work[x]", "work[x+1]", and "[x+2]" of the reference pixels.

When it is determined in step S33 that, for example, the step "work[x]" of the pixel of interest is the largest value of the steps "work[x−3]", "work[x−2]", "work[x−1]", "work[x]", "work[x+1]", and "work[x+2]" of the reference pixels, the process proceeds to step S34. In step S34, on the basis of a determination result in step S33, the step largest-value determinator 53 sets the step "work" of the pixel of interest as a block boundary step (which is a step at a pixel at a block boundary position) and supplies the block boundary step "block_step" (=work[x]) to the block step feature detector 54.

Figure 12:
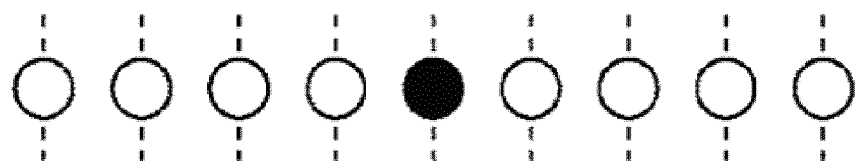
FIG. 12 illustrates the block step information acquirement processing.

That is, for example, when the block boundary position exists between the pixel P[x] and the pixel P[x−1] in FIG. 12, the absolute value of a difference in pixel values between the pixel P[x] and the pixel P[x−1] can be predicted to be larger than the average value of the absolute values of differences between neighborhood pixels, as shown in FIG. 11. Accordingly, in this case, when the absolute value of a difference between the pixel P[x] and the pixel P[x−1] is larger than the average of the absolute values of differences between the neighborhood pixels, the step "work[x]" of the pixel of interest is treated as a block boundary step "block_step[x]".

When it is determined in step S33 that, for example, the step "work[x]" of the pixel of interest is not the largest value of the steps "work[x−3]", "work[x−2]", "work[x−1]", "work [x]", "work[x+1]", and "work[x+2]" of the reference pixels, the process proceeds to step S35. In step S35, on the basis of the determination result of step S33, the step largest-value determinator 53 regards the step "work" of the pixel of interest as not being a block boundary step (which is a step at a pixel at a block boundary position) and supplies the block boundary step "block_step[x]"=0 to the block step feature detector 54.

In step S36, the block step feature detector 54 determines whether or not the block boundary step "block_step[x]" supplied from the step largest-value determinator 53 has a larger value than 0, i.e., whether or not the block boundary step "block_step[x]" indicates a feature of a block boundary step.

When it is determined in step S36 that the block boundary step "block_step[x]" has a larger value than 0 and indicates a feature of a block boundary step, the process proceeds to step S37. In step S37, the block step feature detector 54 sends a notification indicating a block noise strength to the counter "total" updater 55, the block step strength classifier 56, the block boundary determinator 58, and the counter "btotal" updater 59. In response to the notification, the counter "total" updater 55 performs an update by incrementing the counter "total" 81, stored in the step information buffer 32, by 1, the counter "total" 81 indicating the total number of pixels in the input image which were processed as block noise strengths by the block step feature detector 54.

In step S38, the block step strength classifier 56 classifies the block step into a strength class "id", on the basis of the block boundary step "block_step[x]" supplied from the block step feature detector 54, and supplies the classified strength class "id" to the counter "t_hist" updater 57 and the counter "b_hist" updater 60.

Figure 13:
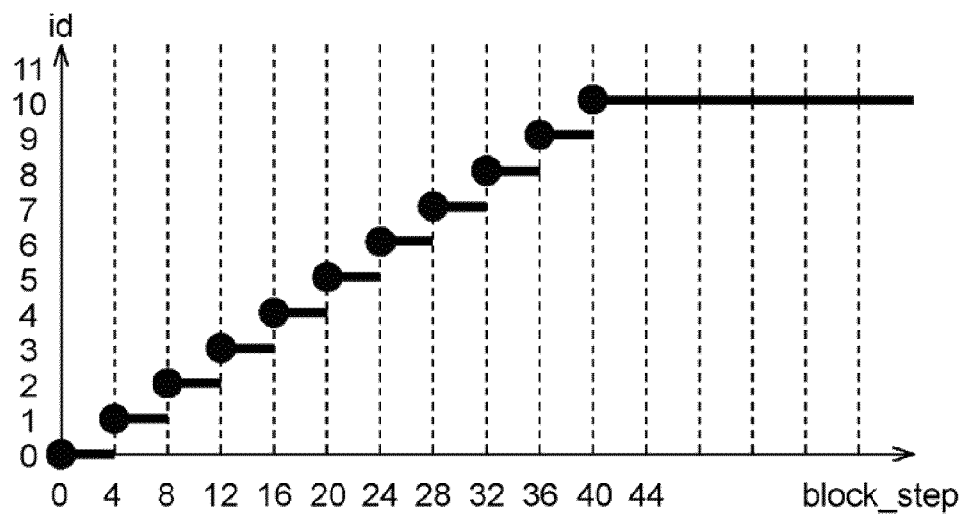
FIG. 13 illustrates the block step information acquirement processing.

Thus, for example, as shown in FIG. 13, the block step strength classifier 56 sets the strength class "id" to 0 for the block boundary step "block_step[x]"=0 to less than 4, sets the strength class "id" to 1 for the block boundary step "block_step[x]"=4 to less than 8, sets the strength class "id" to 2 for the block boundary step "block_step[x]"=8 to less than 12, sets the strength class "id" to 3 for the block boundary step "block_step[x]"=12 to less than 16, sets the strength class "id" to 4 for the block boundary step "block_step[x]"=16 to less than 20, sets the strength class "id" to 5 for the block boundary step "block_step[x]"=20 to less than 24, sets the strength class "id" to 6 for the block boundary step "block_step[x]"=24 to less than 28, sets the strength class "id" to 7 for the block boundary step "block_step[x]"=28 to less than 32, sets the strength class "id" to 8 for the block boundary step "block_step[x]"=32 to less than 36, sets the strength class "id" to 9 for the block boundary step "block_step[x]"=36 to less than 40, and sets the strength class "id" to 10 for the block boundary step "block_step[x]"=40 or more.

That is, in the case of FIG. 13, the block step strength classifier 56 classifies the block steps "block_step[x]" into the respective strength classes "id", in accordance with the values of the block steps "block_step[x]".

Figure 14:
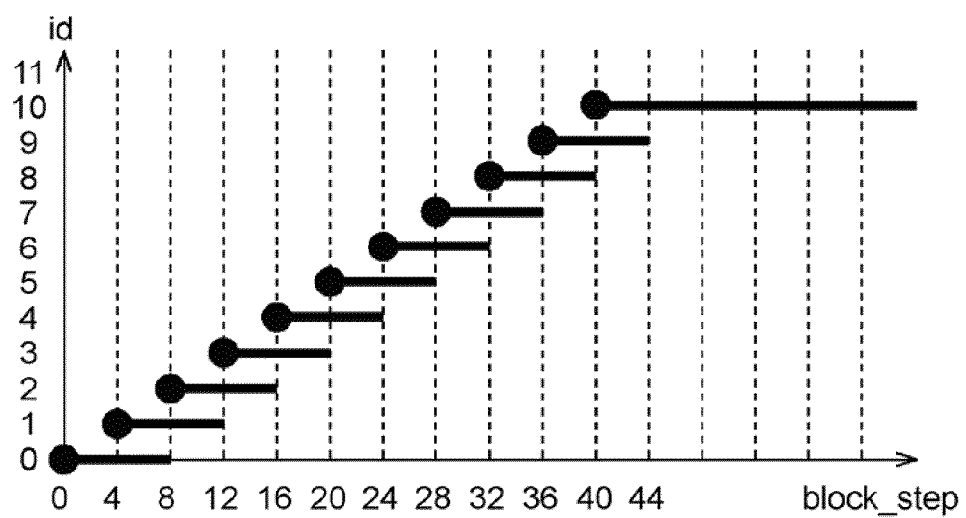
FIG. 14 illustrates the block step information acquirement processing.

Although the description in FIG. 13 has been given of an example in which the strength classes "id" are determined for the block boundary steps "block_step[x]" on a one-to-one basis, for example, two types of strength class "id" may be determined as shown in FIG. 14, since the strength classes "id" have values used for statistics processing, as described below. Thus, for example, as shown in FIG. 14, the block step strength classifier 56 sets the strength class "id" to 0 for the block boundary step "block_step[x]"=0 to less than 4, sets the strength class "id" to 0 or 1 for the block boundary step "block_step[x]"=4 to less than 8, sets the strength class "id" to 1 or 2 for the block boundary step "block_step[x]"=8 to less than 12, sets the strength class "id" to 2 or 3 for the block boundary step "block_step[x]"=12 to less than 16, sets the strength class "id" to 3 or 4 for the block boundary step "block_step[x]"=16 to less than 20, sets the strength class "id" to 4 or 5 for the block boundary step "block_step[x]"=20 to less than 24, sets the strength class "id" to 5 or 6 for the block boundary step "block_step[x]"=24 to less than 28, sets the strength class "id" to 6 or 7 for the block boundary step "block_step[x]"=28 to less than 32, sets the strength class "id" to 7 or 8 for the block boundary step "block_step[x]"=32 to less than 36, sets the strength class "id" to 8 or 9 for the block boundary step "block_step[x]"=36 to less than 40, sets the strength class "id" to 9 or 10 for the block boundary step "block_step[x]"=40 to less than 44 and, sets the strength class "id" to 10 for the block boundary step "block_step[x]"=44 or more.

In step S39, the counter "t_hist" updater 57 increments the counter t_hist[id] 82 in the step information buffer 32 by 1, the counter "t_hist" 82 indicating the total number for each strength class "id" based on the block step strength supplied from the block step strength classifier 56. Even when two types of strength class "id" are determined for one block boundary step "block_step", as described above, the counter "t_hist" updater 57 increments each counter "t_hist[id]" 82 by 1.

In step S40, the block boundary determinator 58 determines whether or not the position between the pixel P[x] of interest and the pixel P[x−1] from which the step "work[x]" that provides a basis for the block boundary step "block_step[x]" was determined is a block boundary position, on the basis of the block size information and the block boundary position information supplied from the block-boundary information detecting section 11.

When it is determined in step S40 that, for example, the position between the pixel P[x] of interest and the pixel P[x−1] from which the step "work[x]" that provides a basis for the block boundary step "block_step[x]" was determined is a block boundary position, the process proceeds to step S41. In step S41, the block boundary determinator 58 supplies a signal indicating that the position in question is a block boundary to the counter "btotal" updater 59 and the counter "b_hist" updater 60. In response to the signal, the counter "btotal" updater 59 increments the counter "btotal" 83 stored in the counter "btotal" 83 by 1, the counter "btotal" 83 indicating, of the number of pixels in the input image that were processed by the block step feature detector 54 as block boundary steps, the total number for each strength class "id".

In step S42, on the basis of the signal that is supplied from the block boundary determinator 58 and that indicates that the position in question is a block boundary, the counter "b_hist" updater 60 increments the counter "b_hist[id]" 84 stored in the step information buffer 32 by 1, the counter "b_hist[id]" 84 indicating, of the number of pixels in the input images that were processed by the block step feature detector 54 as block boundary steps, the total number for each strength class "id". Even when two types of strength class "id" are determined for one block boundary step "block_step", as described above, the counter "b_hist" updater 60 increments each counter "b_hist[id] 84" by 1.

On the other hand, when it is determined in step S36 that the block boundary step "block_step[x]" is not larger than 0, that is, the block boundary step "block_step[x]" does not have a feature of a block boundary step, the processing in steps S37 to S42 is skipped. When it is determined in step S40 that the position in question is not a block boundary position, the processing in steps S41 and S42 is skipped.

In step S43, the step calculator 51 determines whether or not any unprocessed pixel exists in the detection area. When any unprocessed pixel exists, the process returns to step S32. That is, until it is determined that no unprocessed pixel exists, the processing in steps S32 to S43 is repeated. When it is determined in step S43 that no unprocessed pixel exists in all pixels, the block step information acquirement processing ends.

In the above-described processing, steps "work" are calculated for all pixels in a detection area in an input image, strength classes "id" are set in association with block step strengths set for larger ones than the averages of corresponding reference pixels, the counter "t_hist" 82 in the step information buffer 32 is incremented for each strength class "id", and the counter "b_hist" 84 in the step information buffer 32 is incremented for each strength class "id" with respect to pixels that are at block boundary positions. During the processing, the counter "total" 81 in the step information buffer 32 is incremented with respect to the number of pixels in the detection area, and the counter "btotal" 83 in the step information buffer 32 is incremented with respect the number of pixels at a block boundary position in the detection area.

Figure 15:
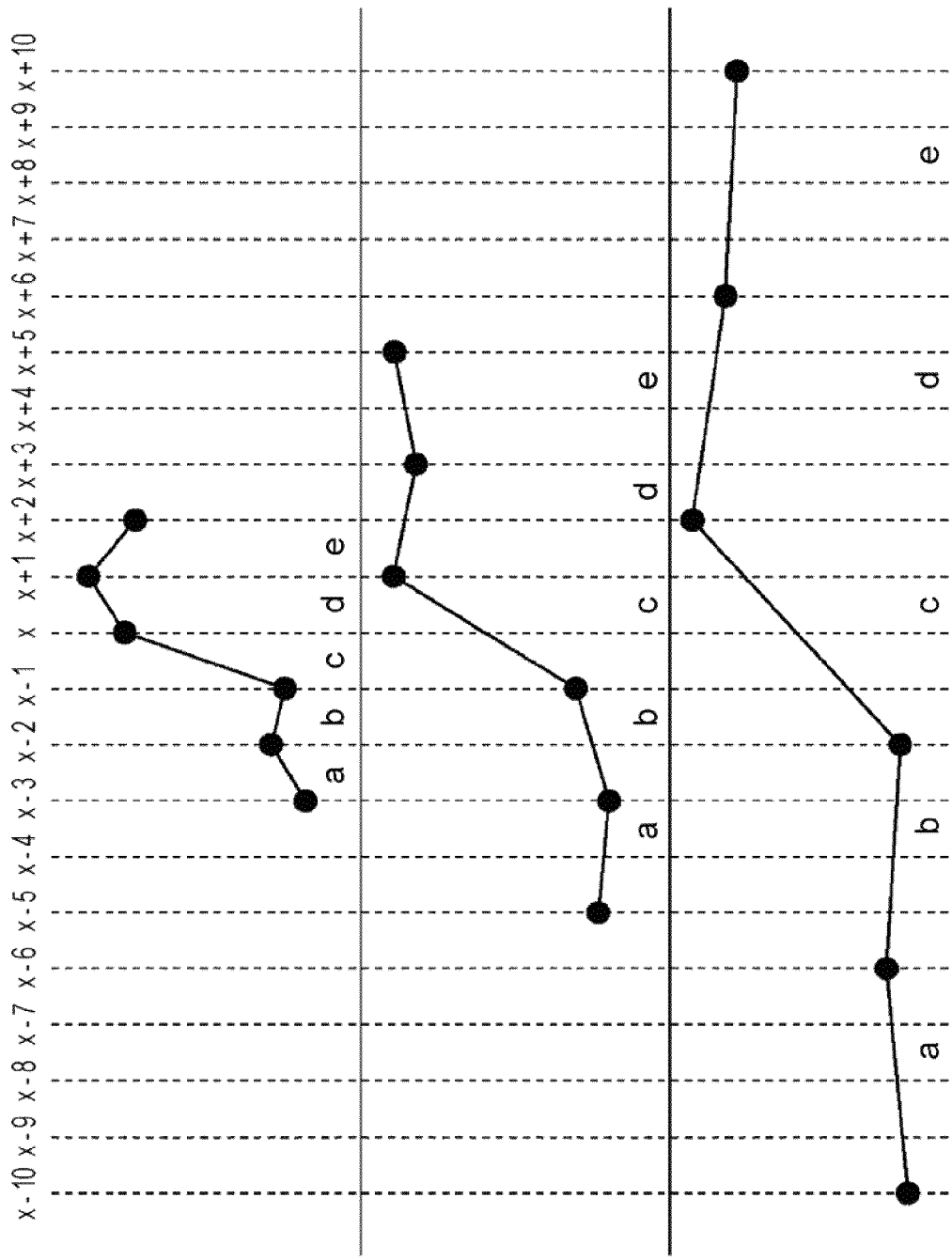
FIG. 15 illustrates the block step information acquirement processing.

Although a case in which the block size is 8 pixels×8 pixels has been described above, the block size may be increased to, for example, 16 pixels×16 pixels or 32 pixels×32 pixels by scaling. In such a case, only the use of the absolute values of differences in pixel values between adjacent pixels as shown in FIG. 11 may not be sufficient to obtain features of block steps in the vicinity of a block boundary position. Accordingly, for an increased block size, for example, when the relationship between a pixel of interest and its neighborhood pixels, as shown in FIG. 11, is one shown at an upper section in FIG. 15, the distance between the pixel of interest and the neighborhood pixel and between the neighborhood pixels may be every two pixels, as shown at a middle section in FIG. 15, rather than every pixel, or may be every four pixels as shown at a lower section in FIG. 15.

Now, a description will be given with reference back to the flowchart in FIG. 9.

When the block step information acquirement processing is finished in step S11, the process proceeds to step S12. In step S12, the statistics processor 33 executes statistics processing to determine a block noise strength for each frame of the input image and supplies the determined block noise strength to the stabilization processor 34.

Figure 16:
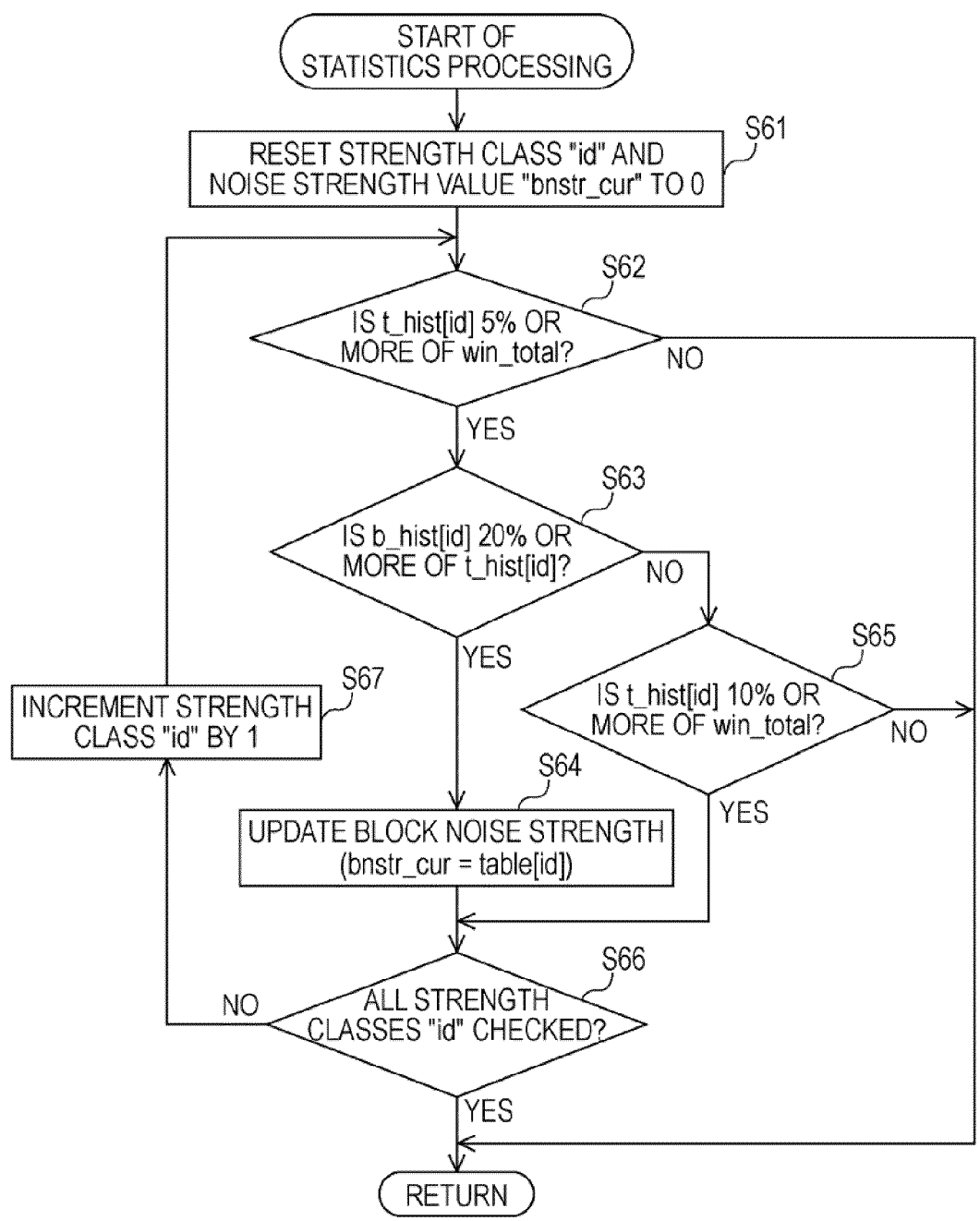
FIG. 16 is a flowchart illustrating statistics processing.

The statistics processing performed by the statistics processor 33 will now be described with reference to a flowchart shown in FIG. 16.

In step S61, the block noise strength updater 105 resets a strength class "id", which serves as a counter indicating a strength class, to 0 and also resets a noise strength value "bnstr_cur" to 0.

In step S62, the total ratio calculator 101 accesses the step information buffer 32, reads the counter "total" 81 and the counter "t_hist[id]" 82, calculates a ratio of the counter "t_hist[id]" 82 to the total number of pixels "win total" (the value of the counter "total" 81), i.e., t_hist[id]/total, which may also be referred to as a "total ratio" hereinafter, and supplies the total ratio to the total ratio determinator 102. The total ratio determinator 102 determines whether or not the total ratio is 5% or more and supplies a determination result to the block noise strength updater 105.

When it is determined in step S62 that, for example, the total ratio is 5% or more, the process proceeds to step S63. In step S63, the boundary ratio calculator 103 accesses the step information buffer 32, reads the counter "t_hist[id]" 82 and the counter "b_hist"[id] 84, calculates a ratio of the counter "b_hist" [id] 84 to the counter "t_hist[id]" 82 (i.e., b_hist[id]/t_hist[id], which may hereinafter be referred to as a "boundary ratio"), and supplies the boundary ratio to the boundary ratio determinator 104. The boundary ratio determinator 104 determines whether or not the total ratio is 20% or more and supplies a determination result to the block noise strength updater 105.

Figure 17:
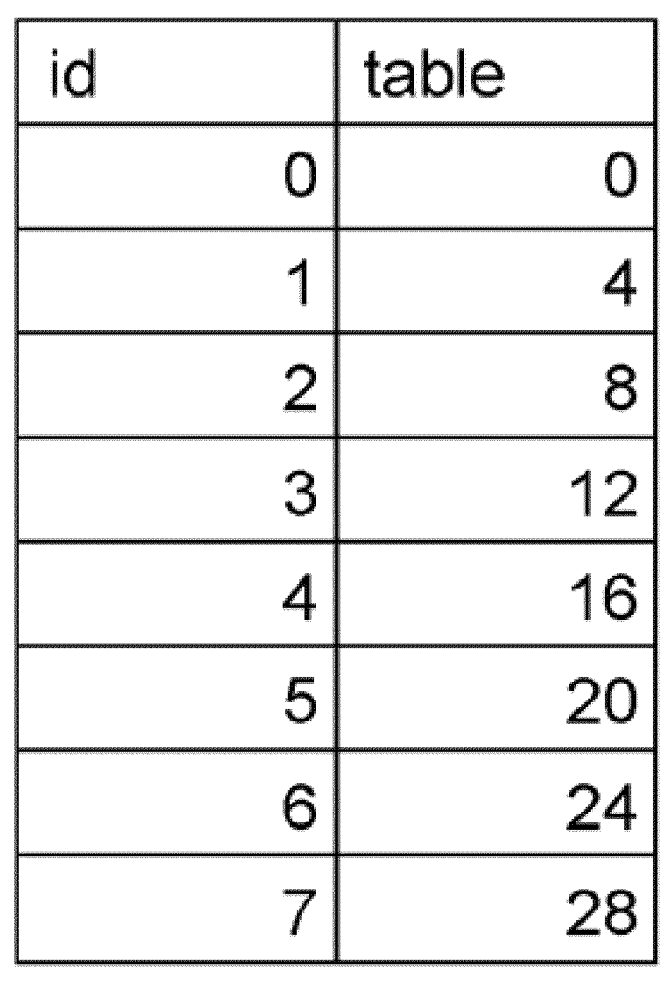

When it is determined in step S63 that the ratio of the counter "b_hist"[id] 84 to the counter "t_hist[id]" 82 is 20% or more, the process proceeds to step S64. In step S64, on the basis of the determination results of the total ratio determinator 102 and the boundary ratio determinator 104, the block noise strength updater 105 updates, as a table [id], the block noise strength value "bnstr_cur" of the current frame of the input image by referring to the strength table 105a. That is, for example, when the strength table 105a is one as shown in FIG. 17, the block noise strength updater 105 sets the noise strength value "bnstr_cur" to 0 for the strength class "id"=0, sets the noise strength value "bnstr_cur" to 4 (=table[1]) for the strength class "id"=1, sets the noise strength value "bnstr_cur" to 8 (=table[2]) for the strength class "id"=2, sets the noise strength value "bnstr_cur" to 12 (=table[3]) for the strength class "id"=3, sets the noise strength value "bnstr_cur" to 16 (=table[4]) for the strength class "id"=4, sets the noise strength value "bnstr_cur" to 20 (=table[5]) for the strength class "id"=5, sets the noise strength value "bnstr_cur" to 24 (=table[6]) for the strength class "id"=6, and sets the noise strength value "bnstr_cur" to 28 (=table[7]) for the strength class "id"=7. The strength table 105a in FIG. 17 is a table showing block step strengths that are substantially converted back from the strength classes shown in FIG. 13, but the present invention is not limited thereto and another strength table 105a may be used.

In step S66, a determination is made as to whether or not the processing has been performed on strength classes "id" indicating all noise strengths. When it is determined that the processing has not been performed on all strength classes "id", the block noise strength updater 105 increments the counter "id" by 1 in step S67. The process then returns to step S62. That is, until it is determined that the processing has been performed on all counters "id", the processing in steps S62 to S67 is repeated. When it is determined in step S66 that the processing has been performed on all counters "id", the statistics processing ends.

On the other hand, when it is determined in step S62 that the total ratio is not 5% or more, the statistics processing ends.

In addition, when it is determined in step S63 that the boundary ratio is not 20% or more, the process proceeds to step S65 in which the total ratio calculator 101 accesses the step information buffer 32, reads the counter "total" 81 and the counter "t_hist[id]" 82, calculates a total ratio (=t_hist [id]/total), and supplies the calculated total ratio to the total ratio determinator 102. The total ratio determinator 102 determines whether or not the total ratio is 10% or more. When it is determined in step S65 that the total ratio (=t_hist[id]/total) is 10% or more, the process proceeds to step S66 and the processing subsequent thereto is repeated. When it is determined in step S65 that the total ratio (=t_hist[id]/total) is not 10% or more, the statistics processing ends.

That is, for example, as shown in FIG. 18, when the respective counters "b_hist[id]" 84 are 300, 150, 45, 18, 15, 10, 2 and 1 and the counters "t_hist[id]" 82 are 1000, 400, 200, 110, 50, 60, 20, and 10 for the corresponding strength classes "id" 0 to 7, the boundary ratios (=b_hist[id]/t_hist[id]) are 30%, 38%, 23%, 16%, 30%, 17%, 10%, and 10% and the total ratios (=t_hist[id]/total) are 54%, 22%, 11%, 6%, 3%, 3%, 1%, and 1%, respectively.

Thus, in the case of FIG. 18, since the total ratios (=t_hist [id]/total) are 5 or more for the block noise strengths "id"=0 to 3, the processing is performed regarding that the probability of the presence of overall noise for the counters "id" indicating the noise strengths is at a considerable level. Since an example in which the block size is basically 8 pixels×8 pixels is described in this case, the ratio is assumed to be about ⅛ (=12.5) in the absence of distortion and the threshold is set to 5, which is smaller than 12.5. The threshold, however, may have a value other than 5. For example, when the block size is 8 pixels×8 pixels, the threshold may be set to have a value smaller than 12.5.

In addition, since the boundary ratios (=b_hist[id]/t_hist [id]) of the block noise strengths "id"=0 to 2 are 20% or more, the block noise strengths "bnstr_cur" of the frame are sequentially updated. Thus, in the case of FIG. 18, the noise strength values "bnstr_cur" are sequentially updated in such a manner that the noise strength value "bnstr_cur" is updated to 0 for the block noise strength "id"=0, the noise strength value "bnstr_cur" is updated to 4 for the block noise strength "id"=1 in a next loop, and the noise strength value "bnstr_cur" is then updated to 8 for the block noise strength "id"=2.

In this case, for the block noise strength "id"=3, the noise strength value "bnstr_cur" is not updated since the boundary ratio (=b_hist[id]/t_hist[id]) is not 20% or more. However, since the total ratio is 10% or more, the processing is not terminated at the block noise strength "id"=3, and the process proceeds to processing for the block noise strength "id"=4.

In addition, since the total ratio (=t_hist[id]/total) is not 5 or more for the block noise strength "id"=4, the processing is terminated regarding that the probability of the presence of overall noise for the counter "id" indicating the noise strength is at a considerable level.

As a result of the above-described statistics processing, the block noise strength "bnstr_cur" for the frame having the conditions shown in FIG. 18 is determined as 8.

As also shown in FIG. 18, in general, the total ratio (=t_hist[id]/total) decreases monotonically according to an increase in the counter "id". Since the counter "id" in the flowchart in FIG. 16 is processed in an ascending order, the processing is terminated at a point of time when the total ratio falls below 5, that is, at a point of time for the block noise id=4 in FIG. 18.

In addition, since the description in this case is given of an example in which the block size is basically 8 pixels×8 pixels, the ratio is about ⅛ (=12.5) in the absence of block distortion and the ratio is 20% (which serves as the threshold) in the presence of block distortion, assuming that the ratio has a larger value than 12.5. Thus, when the block size is 8 pixels×8 pixels, the threshold may be set to a larger value than 12.5.

The above-described processing makes it possible to determine, as a block noise strength of a frame, the largest one of the block noise strengths that statistically account for a relatively large ratio and that are likely to involve block distortion.

Now, a description will be given with reference back to the flowchart in FIG. 9.

When the statistics processing is finished in step S12, the process proceeds to step S13. In step S13, the stabilization processor 34 executes stabilization processing to stabilize the determined block noise strength "bnstr_cur", on the basis of the block noise strengths "bnstr_cur" of the previous and subsequent frames.

Figure 19:
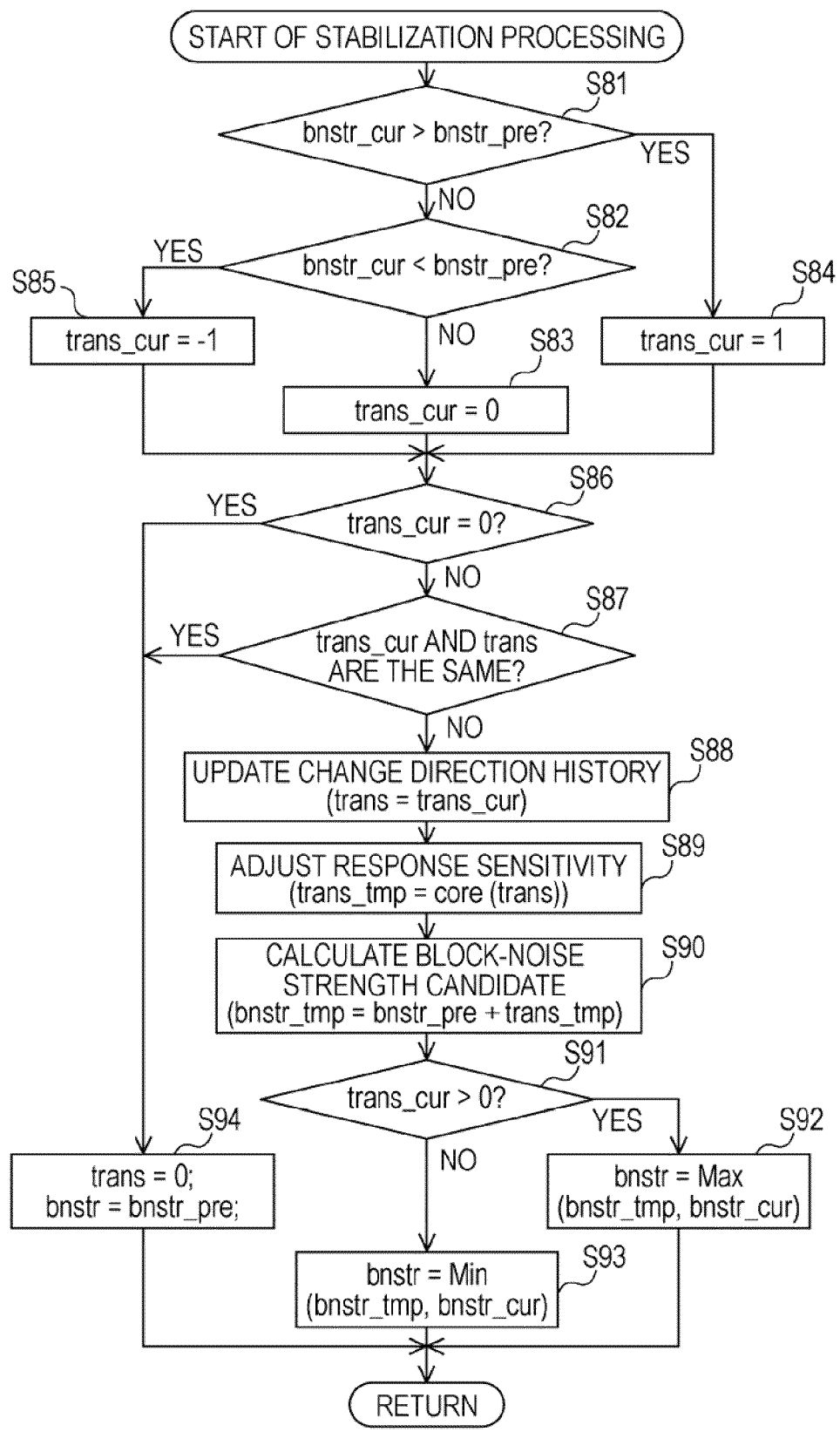
FIG. 19 is a flowchart illustrating stabilization processing.

The stabilization processing performed by the stabilization processor 34 will now be described with reference to a flowchart shown in FIG. 19.

In step S81, the strength-change direction determinator 121 stores the block noise strength "bnstr_cur" in the direction history storage 122 and also determines whether or not the block noise strength "bnstr_cur" is larger than the block noise strength "bnstr_pre" of a previous frame, the block noise strength "bnstr_pre" being stored in the direction history storage 122.

When it is determined in step S81 that, for example, the block noise strength "bnstr_cur" is not larger than the block noise strength "bnstr_pre", the process proceeds to step S82. In step S82, the strength-change direction determinator 121 determines whether or not the block noise strength "bnstr_cur" is smaller than the block noise strength "bnstr_pre" of the previous frame, the block noise strength "bnstr_pre" being stored in the direction history storage 122.

When it is determined in step S82 that, for example, the block noise strength "bnstr_cur" is not smaller than the block noise strength "bnstr_pre", i.e., the block noise strength "bnstr_cur" is equal to the block noise strength "bnstr_pre", the strength-change direction determinator 121 sets a strength change direction "trans_cur" to 0 in step S83 and supplies the set strength change direction "trans_cur" to the direction comparator 123.

On the other hand, when it is determined in step S81 that, for example, the block noise strength "bnstr_cur" is larger than the block noise strength "bnstr_pre", the process proceeds to step S84. In step S84, the strength-change direction determinator 121 sets the strength change direction "trans_cur" to 1 and supplies the set strength change direction "trans_cur" to the direction comparator 123.

In addition, when it is determined in step S82 that, for example, the block noise strength "bnstr_cur" is smaller than the block noise strength "bnstr_pre", the process proceeds to step S85. In step S85, the strength-change direction determinator 121 sets the strength change direction "trans_cur" to −1 and supplies the set strength change direction "trans_cur" to the direction comparator 123.

That is, as a result of the comparison between the block noise strength "bnstr_cur" of the current frame and the block noise strength "bnstr_pre" of the previous frame, when the block noise strength has a tendency to increase in a time direction, the strength change direction "trans_cur" is set to 1, when the block noise strength has a tendency to stay the same in the time direction, the strength change direction "trans_cur" is set to 0, and when the block noise strength has a tendency to decrease in the time direction, the strength change direction "trans_cur" is set to −1.

In step S86, the direction comparator 123 determines whether or not the strength change direction "trans_cur" of the current frame is 0.

When the strength change direction "trans_cur" of the current frame is not 0 in step S86, the process proceeds to step S87. In step S87, the direction comparator 123 compares the strength change direction "trans_cur" of the current frame with a cumulative strength change direction "trans" to determine whether or not the strength change direction "trans_cur" and the cumulative strength change direction "trans" are the same, that is, whether or not the polarity relationships between the strength change direction "trans_cur" and the cumulative strength change direction "trans" are the same.

When it is determined in step S87 that, for example, the strength change direction "trans_cur" of the current frame and the cumulative strength change direction "trans" are not the same, the process proceeds to step S88. In step S88, the direction comparator 123 updates the current-frame strength change direction "trans_cur" supplied from the strength-change direction determinator 121, by adding the strength change direction "trans_cur" to the cumulative strength change direction "trans", and stores the updated change direction in the change direction history storage 124. In this case, the direction comparator 123 also supplies the current-frame strength change direction "trans_cur", supplied from the strength-change direction determinator 121, to the block-noise strength candidate calculator 126.

Figure 20:
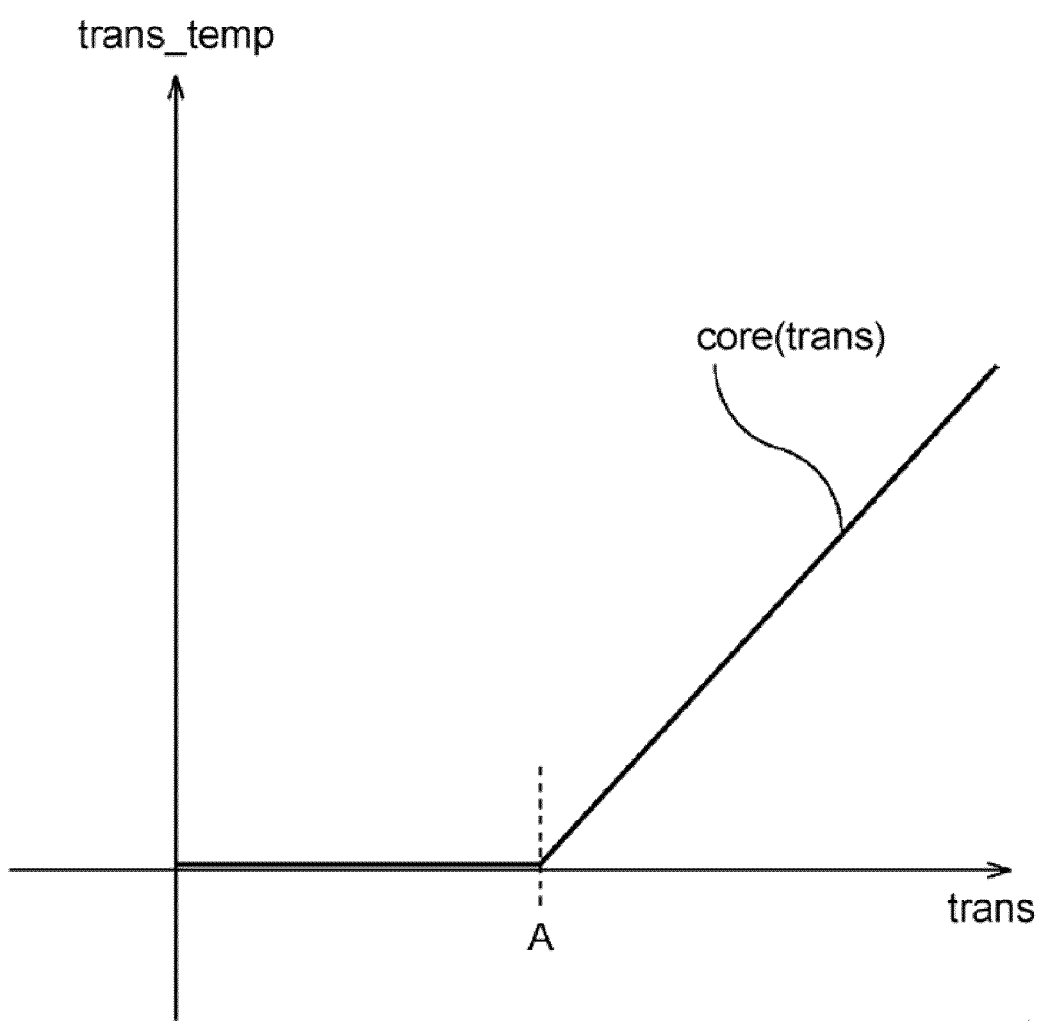
FIG. 20 is a graph illustrating the stabilization processing.

In step S89, the response sensitivity adjuster 125 uses a predetermined function to adjust the cumulative strength change direction "trans" stored in the change direction history storage 124, determines an adjusted strength change direction "trans_tmp", and supplies the adjusted strength change direction "trans_tmp" to the block-noise strength candidate calculator 126. More specifically, for example, the response sensitivity adjuster 125 uses a function "core (trans)" as shown in FIG. 20 to calculate the adjusted strength change direction "trans_tmp". In FIG. 20, when the cumulative strength change direction "trans" is smaller than A, the adjusted strength change direction "trans_tmp" is set to 0, and when the cumulative strength change direction "trans" is larger than or equal to A, the adjusted strength change direction "trans_tmp" is set to "trans"−A. That is, even when the strength change direction changes sharply, this function reduces a change in the value to thereby adjust the response sensitivity.

In step S90, the block-noise strength candidate calculator 126 calculates a block-noise strength candidate "bnstr_tmp"

in accordance with expression (2) below and supplies the calculated block-noise strength candidate "bnstr_tmp" to the strength stabilizer 127.

$$bnstr\_tmp = bnstr\_pre + trans\_tmp \quad (2)$$

That is, the block-noise strength candidate "bnstr_tmp" is determined, as a value adjusted according to a time change in the strength change direction, by adding the adjusted strength change direction "trans_tmp" to the block noise strength "bnstr_pre" of the previous frame.

In step S91, the strength stabilizer 127 determines whether or not the strength change direction "trans_cur" of the current frame is larger than 0, that is, whether or not the block noise strength has increased relative to the time change. For example, when the strength change direction "trans_cur" of the current frame is larger than 0, the strength stabilizer 127 determines an stabilized block noise strength "bnstr" of the current frame in step S92 through calculation of expression (3) below and supplies the stabilized block noise strength "bnstr" to the block-noise reduction processing section 13.

$$bnstr = Max(bnstr\_tmp, bnstr\_cur) \quad (3)$$

where Max (A, B) is a function for selecting a larger value of A and B. That is, when the strength change direction "trans_cur" of the current frame is larger than 0, a larger value of the block-noise strength candidate "bnstr_tmp" and the block noise strength "bnstr_cur" of the current frame is set as the stabilized block noise strength "bnstr" of the current frame. That is, since the strength change direction is an increasing direction, a larger one of the block-noise strength candidate "bnstr_tmp" and the block noise strength "bnstr_cur" of the current frame is selected.

When the strength change direction "trans_cur" of the current frame is not larger than 0 in step S91, the process proceeds to step S93. In step S93, the strength stabilizer 127 determines a stabilized block noise strength "bnstr" of the current frame through calculation of expression (4) below and supplies the stabilized block noise strength "bnstr" to the block-noise reduction processing section 13.

$$bnstr = Min(bnstr\_tmp, bnstr\_cur) \quad (4)$$

where Min (A, B) is a function for selecting a smaller value of A and B. That is, when the strength change direction "trans_cur" of the current frame is not larger than 0, a smaller value of the block-noise strength candidate "bnstr_tmp" and the block noise strength "bnstr_cur" of the current frame is set as the stabilized block noise strength "bnstr" of the current frame. That is, when the strength change direction is a decreasing direction, a smaller one of the block-noise strength candidate "bnstr_tmp" and the block noise strength "bnstr_cur" of the current frame is selected.

On the other hand, when the strength change direction "trans_cur" of the current frame is 0 in step S86 or when the strength change direction "trans_cur" of the current frame and the cumulative strength change direction "trans" are the same in step S87, the process proceeds to step S94. In step S94, the strength stabilizer 127 sets the stabilized block noise strength "bnstr" of the current frame to the block noise strength "bnstr_pre" of the previous frame. In this case, the strength stabilizer 127 sets the cumulative strength change direction "trans", stored in the change direction history storage 124, to 0.

Figure 21:
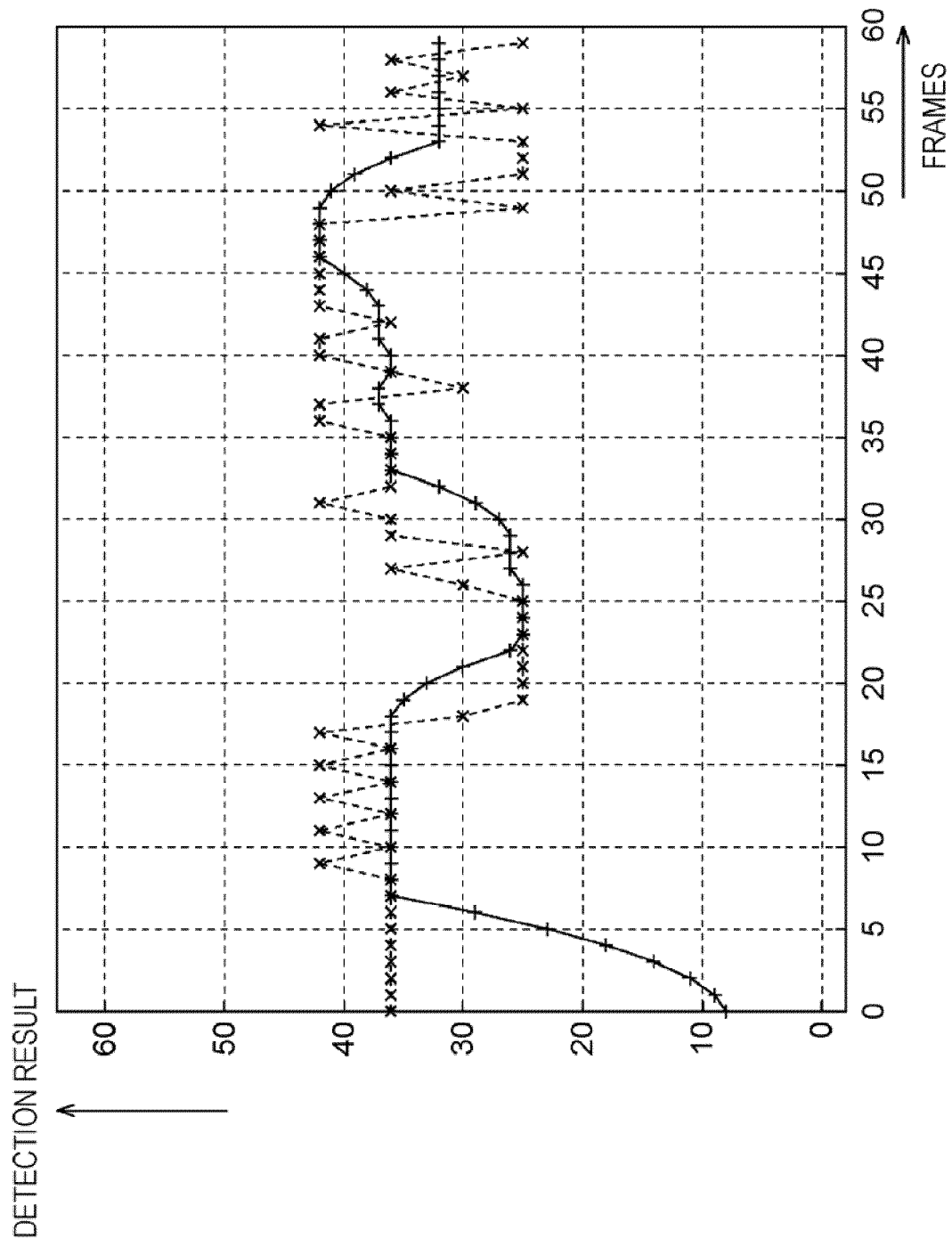
FIG. 21 is a graph illustrating the stabilization processing.

As a result of the above-described processing, for example, the block noise strength is stabilized as shown in FIG. 21. In FIG. 21, the horizontal axis indicates frames, the vertical axis indicates detection results of the block noise strengths, the solid line indicates stabilized block noise strengths "bnstr", and the dotted line indicates pre-stabilization block noise strengths "bnstr_cur" of the frames.

That is, for example, for frames 0 to 8, it is determined in step S81 that the block noise strength "bnstr_cur" of the current frame is larger than the block noise strength "bnstr_pre" of the previous frame. Thus, the processing in steps S84 and S86 to S92 is sequentially repeated, so that the block noise strength increases stably from an initial value to a value of about 36, which is the block noise strength "bnstr_cur" of the current frame, at a rate of change according to the period of continuation.

For frames 9 to 18, it is determined in step S87 that the strength change direction "trans_cur" of the current frame and the cumulative strength change direction "trans" are not the same. Thus, since the block noise strength of the previous frame is maintained, the block noise strengths "bnstr" become constant.

For frames 19 to 25, since it is determined in step S81 that the block noise strength "bnstr_cur" of the current frame is smaller than the block noise strength "bnstr_pre" of the previous frame, the processing in steps S82, S83, and S86 to S93 is sequentially repeated and the block noise strength decreases stably to a value of about 25, which is the block noise strength "bnstr_cur" of the current frame, at a rate of change according to the period of continuation.

For frames 26 to 35 except frames 28 and 31, the block noise strength generally has a value of about 36. Thus, since it is basically determined in step S81 that the block noise strength "bnstr_cur" of the current frame is larger than the block noise strength "bnstr_pre" of the previous frame, the processing in steps S84 and S86 to S92 is sequentially repeated and the block noise strength increases stably from the initial value to a value of about 36, which is the block noise strength "bnstr_cur" of the current frame, at a rate of change according to the period of continuation. For frames 28 and 31, however, any instable change is absorbed based on the response sensitivity "trans_tmp", which makes it possible to stably change the value of the stabilized block noise strength "bnstr".

For frames 36 to 48 except frames 38, 39, and 42, the block noise strength generally has a value of about 42. Thus, it is determined in step S81 that the block noise strength "bnstr_cur" of the current frame is basically larger than the block noise strength "bnstr_pre" of the previous frame. Thus, the processing in steps S84 and S86 to S92 is sequentially repeated and the block noise strength increases stably to a value of about 42, which is the block noise strength "bnstr_cur" of the current frame, at a rate of change according to the period of continuation. For frames 38, 39 and 42, however, any instable change is absorbed based on the response sensitivity "trans_tmp", which makes it possible to stably change the value of the stabilized block noise strength "bnstr".

For frames 49 to 53 except frame 50, it is determined in step S81 that the block noise strength "bnstr_cur" of the current frame is smaller than the block noise strength "bnstr_pre" of the previous frame. Thus, the processing in steps S82, S83, and S86 to S93 is sequentially repeated and the block noise strength decreases stably to a value of about 25, which is the block noise strength "bnstr_cur" of the current frame, at a rate of change according to the period of continuation. For frame 50, however, any instable change is absorbed based on the response sensitivity "trans_tmp", which makes it possible to stably change the value of the stabilized block noise strength "bnstr".

For frames 54 to 59, since it is determined in step S87 that the strength change direction of the current frame and the cumulative strength change direction "trans" are not the same, the block noise strength of the previous frame is maintained and the block noise strengths "bnstr" become constant.

That is, even when the block noise strength of the current frame changes sharply, the change in direction of the block noise strength is compared with that of the block noise strength of the previous frame, and the value of the block noise strength of the previous frame is used unless the change directions are the same. Thus, since a small amount of change in a change direction is not considered, it is possible to stabilize a small amount of change. In addition, when the direction of change in the block noise strength of the current frame matches the direction of change of the block noise strength of the previous frame, it is possible to gently follow the change according to a rate of change according to the period of continuation in which the matching continues.

The above-described processing adjusts the block noise strengths so as to prevent extremely large changes in values while time-sequentially considering the strength change directions of the block noise strengths of the previous frames, to thereby adjust the block noises for the respective frames.

Now, a description will be given with reference back to the flowchart in FIG. 9.

When the stabilization processing is finished in step S13, the block noise strength measurement processing ends.

Now, a description will be given with reference back to the flowchart in FIG. 7.

When the block-noise strength measuring section 12 measures the block noise strength in step S5, the process proceeds to step S6 in which the block-noise reduction processing section 13 executes block-noise reduction processing to reduce block noise in the input image and outputs an image having reduced block noise.

Figure 22:
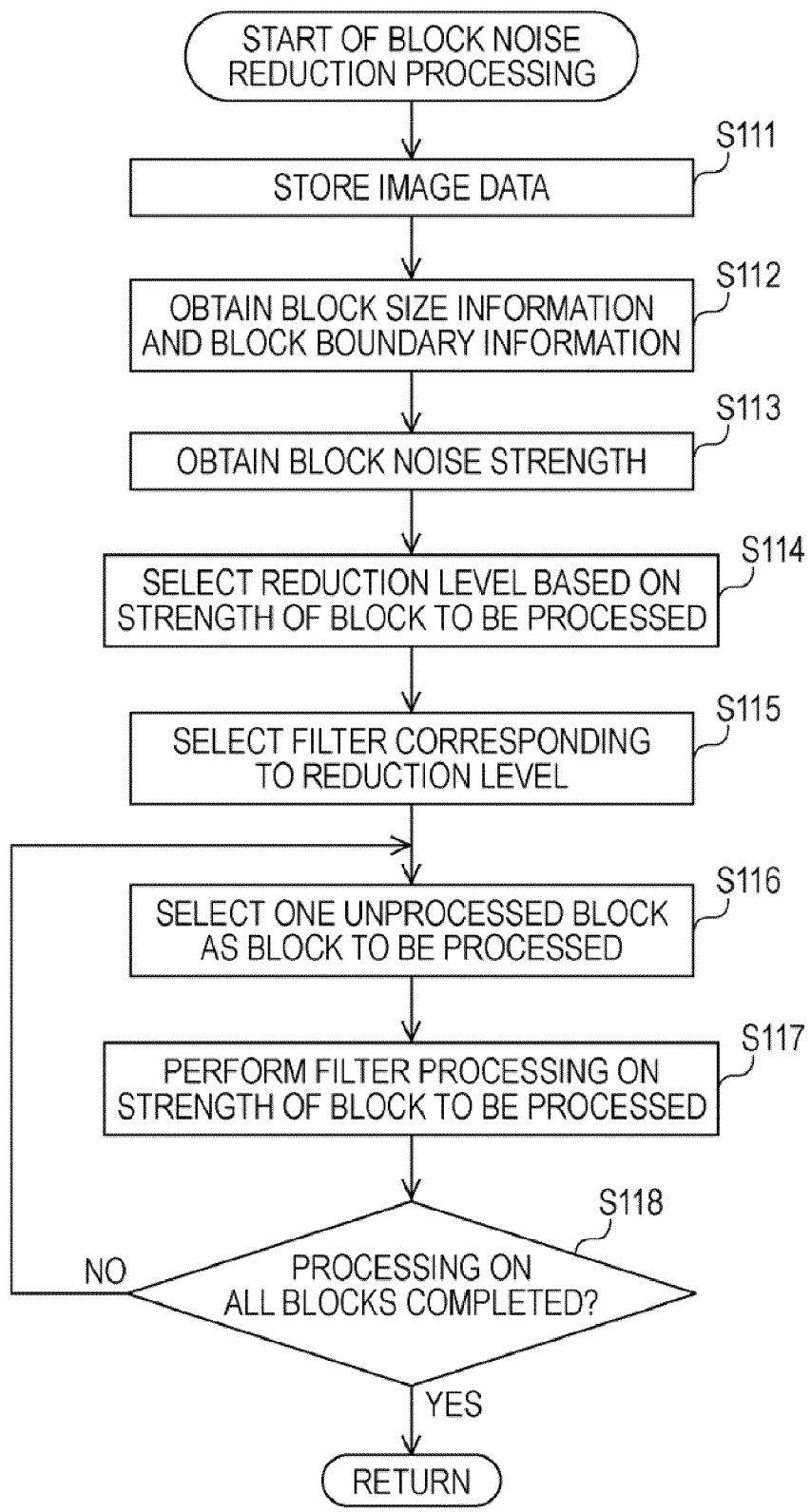
FIG. 22 is a flowchart illustrating block noise reduction processing.

The block-noise reduction processing performed by the block-noise reduction processing section 13 shown in FIG. 6 will now be described with reference to a flowchart shown in FIG. 22.

In step S111, the data storage 151 stores the input image.

In step S112, the block pixel extractor 152 obtains the block size information and the block boundary position information supplied from the block-boundary information detecting section 11.

In step S113, a reduction-level converter 153 obtains the statistically determined block noise strength "bnstr" of the current frame, the block noise strength "bnstr" being supplied from the block-noise strength measuring section 12.

In step S114, on the basis of information of the block noise strength "bnstr", the reduction-level converter 153 selects a reduction level to which the block noise is to be reduced and supplies the reduction level to the filter selector 154. The reduction level has a value set according to the block noise strength "bnstr".

In step S115, the filter selector 154 selects a preset filter from the filter table 154a in accordance with the value of the reduction level and supplies the selected filter to the block noise reducer 155.

In step S116, the block pixel extractor 152 sets one unprocessed block as a block to be processed, reads pixels in the block from the data storage 151, and supplies the pixels to the block noise reducer 155.

In step S117, the block noise reducer 155 uses the filter, supplied from the filter selector 154, to reduce block noise of the pixels in the block to be processed and sequentially outputs pixels of an image having reduced noise.

In step S118, the block pixel extractor 152 determines whether or not any unprocessed block exists. When any unprocessed block exists, the process returns to step S116.

That is, until it is determined that no unprocessed block exists, the processing in steps S116 to S118 is repeated. When it is determined in step S118 that the processing on all blocks has been completed, the block-noise reduction processing ends.

The above-described processing makes it possible to eliminate block noise while optimizing the reduction level of the block noise in accordance with the block noise strength.

According to the present invention, the block noise strength "bnstr" is determined, the noise reduction level of a filter for reducing block noise is set according to the determined block noise strength "bnstr", and the block noise is reduced for each block. Thus, such a reduction in the block noise of an image can reduce cases in which an important image disappears or block noise is not reduced and thus can efficiently reduce block noise.

The above-described series of image processing can be executed by hardware or software. When the series of processing is executed by software, a program included in the software is installed from a storage medium to, for example, a computer incorporated in dedicated hardware or to a general-purpose personal computer that is capable of executing various functions through installation of various programs.

Figure 23:
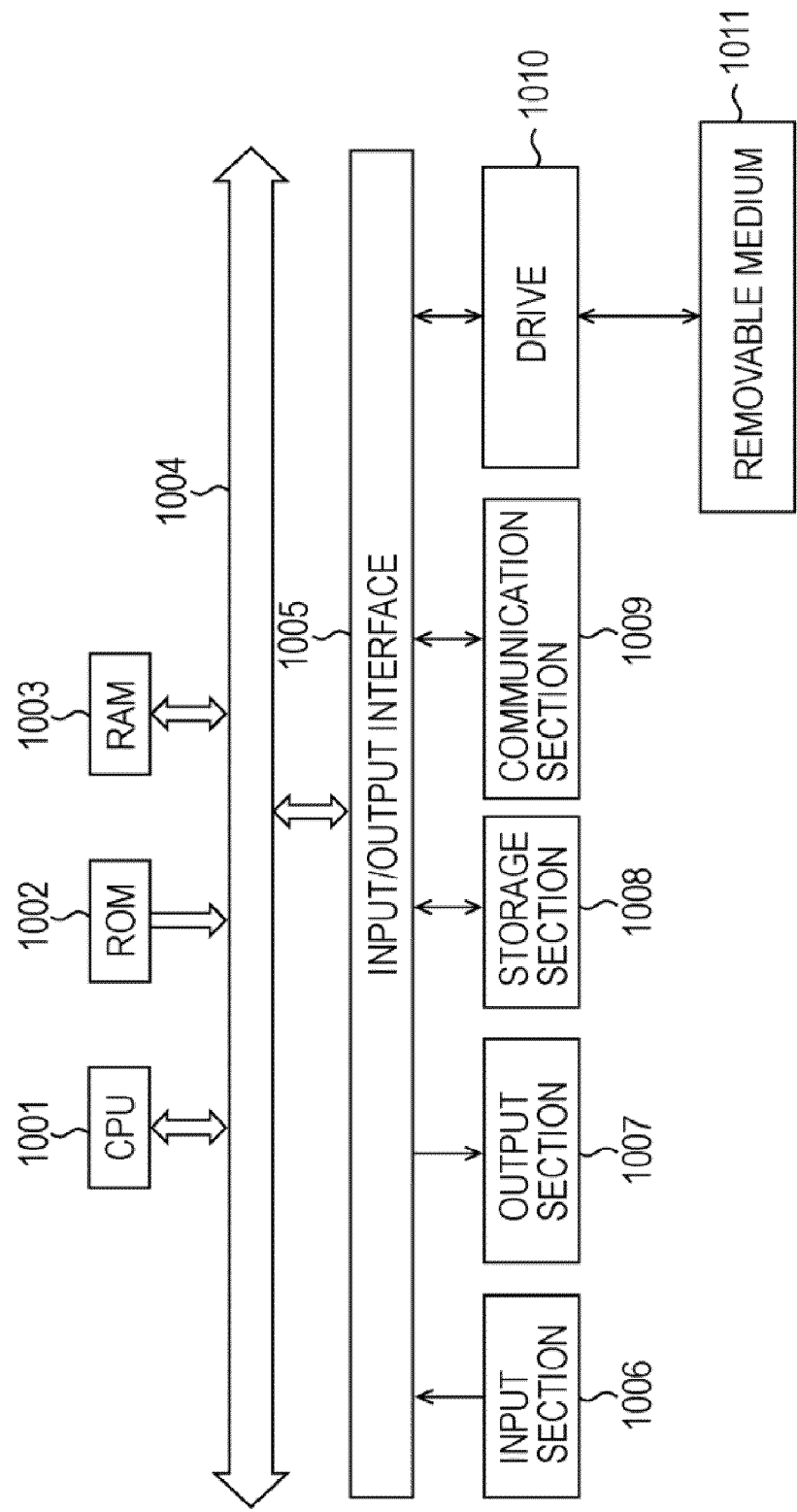
FIG. 23 is a diagram illustrating an example of the configuration of a general-purpose personal computer.

FIG. 23 shows an example of the configuration of a general-purpose personal computer. This personal computer has a built-in CPU (central processing unit) 1001. An input/output interface 1005 is connected to the CPU 1001 through a bus 1004. A ROM (read only memory) 1002 and a RAM (random access memory) 1003 are connected to the bus 1004.

An input section 1006, an output section 1007, a storage section 1008, and a communication section 1009 are connected to the input/output interface 1005. The input section 1006 includes input devices, such as a keyboard and a mouse, for allowing a user to input operation commands. The output section 1007 outputs, on a display device, a screen for processing operation and an image resulting from processing. The storage section 1008 includes, for example, a hard disk drive that stores programs and various types of data. The communication section 1009 includes a LAN (local area network) adapter and so on to execute communication processing through a network, such as a the Internet. A drive 1010 for writing/reading data to/from a removable medium 1011 is further connected to the input/output interface 1005. Examples of the removable medium 1011 include a magnetic disk (including a flexible disk), an optical disk (including a CD-ROM [compact disc-read only memory] and a DVD [digital versatile disc]) and a magneto-optical disk (including a MD (Mini Disc), as well as a semiconductor memory.

The CPU 1001 executes various types of processing in accordance with a program stored in the ROM 1002 or a program read from the removable medium 1011, stored on the storage section 1008, and loaded therefrom to the RAM 1003. The RAM 1003 stores data that the CPU 1001 uses to execute various types of processing, as appropriate.

Herein, the steps for describing the program recorded on the storage medium not only include processing that is time-sequentially performed according to the described sequence but also include processing that is concurrently or individually executed without being necessarily time-sequentially processed.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
   step calculating means for calculating a step of each pixel in an image, the step being obtained by subtracting, from an absolute value of a difference in pixel values between the pixel and one adjacent reference pixel of the pixel, an average value of absolute values of differences in pixel values between any two in a neighborhood among the pixel and reference pixels of the pixel except for a neighborhood between the pixel and the one adjacent reference pixel of the pixel, wherein the reference pixels or the pixel are all horizontal pixels of the pixel of all vertical pixels of the pixel, wherein the step calculating means further includes storing means for storing the step of the pixel, and when the step of the pixel of interest is a largest one among the step of the pixel of interest and the steps of the reference pixels of the pixel of interest stored by the storing means, the step calculating means sets the step of the pixel of interest as a block boundary step;
   classifying means for classifying the pixels into classes for areas of the block boundary steps;
   boundary ratio calculating means for calculating, as a boundary ratio, a ratio of the number of pixels at a block boundary for each of the classes to the number of pixels in the image for the each of the classes; and
   block noise strength determining means for determining, as a block noise strength of the image, the block boundary step that is larger than a predetermined threshold and that is at a class having a largest value.

2. The image processing device according to claim 1, further comprising stabilizing means for correcting and stabilizing, when the image is a moving image, the block noise strength of a current image containing a pixel of interest in accordance with a block noise strength of an image that is close in time.

3. The image processing device according to claim 1, wherein the step calculating means further includes storing means for storing multiple pieces of information of values of the differences of the pixels of interest,
   wherein when the difference value of the pixel of interest is a largest one of the difference values of the pixels of interest, the difference values being stored by the storing means, the step calculating means sets the difference value of the pixel of interest as the step of the pixel of interest.

4. The image processing device according to claim 1, wherein the step calculating means changes the reference pixel on a basis of a block size.

5. The image processing device according to claim 1, wherein a position of the block boundary is calculated based on information expressed by a scaling initial position and a scaling ratio for a reference block size.

6. The image processing device according to claim 1, wherein the boundary ratio calculating means calculates the ratio of the number of pixels at the block boundary for each of the classes in ascending order of corresponding block boundary steps.

7. The image processing device according to claim 6, further comprising:
   total ratio calculating means for calculating, as a total ratio, a ratio for each of the classes relative to the pixels of the entire image,
   wherein when the total ratio is smaller than another predetermined threshold that is smaller than the predetermined threshold, the boundary ratio calculating means suspends the calculation of the total ratio of a larger class of a corresponding step than the class.

8. An image processing method comprising the steps of:
   calculating a step of each pixel in an image, the step being obtained by subtracting, from an absolute value of a difference in pixel values between the pixel and one adjacent reference pixel of the pixel, an average value of absolute values of differences in pixel values between any two in a neighborhood among the pixel and reference pixels of the pixel except for a neighborhood between and the pixel and the one adjacent reference pixels of the pixel, wherein the reference pixels of the pixel are all horizontal pixels of the pixel or all vertical pixels of the pixel;
   storing the step of the pixel, wherein the step of the pixel of interest is a largest one among the step of the pixel of interest and the steps of the reference pixels of the pixel of interest stored, the step of the pixel of interest is set as a block boundary step;
   classifying the pixels into classes for areas of the block boundary steps;
   calculating, as a boundary ratio, a ratio of the number of pixels at a block boundary for each of the classes to the number of pixels in the image for the each of the classes; and
   determining, as a block noise strength of the image, the block boundary step that is larger than a predetermined threshold and that is at class having a largest value.

9. The method according to claim 1, wherein the processing further comprises the step of:
   correcting and stabilizing, when the image is a moving image, the block noise strength of a current image containing a pixel of interest in accordance with a block noise strength of an image that is close in time.

10. The method according to claim 1, wherein the processing further comprises the step of:
    storing multiple pieces of information of vales of the differences of the pixels of interest, wherein when the difference value of the pixel of interest is a largest one of the difference values of the pixels of interest the difference values being stored by the storing means, the step calculating means sets tile difference value of the pixel of interest as the step of the pixel of interest.

11. The method according to claim 1, wherein the processing further comprises the step of changing the reference pixel on a basis of a block size.

12. The method according to claim 1, wherein the processing further comprises the step of calculating a position of the block boundary based on information expressed by a scaling initial position and a scaling ratio for a reference block size.

13. The method according to claim 1, wherein the processing further comprises the step of calculating the ratio of the number of pixels at the block boundary for each of the classes in ascending order of corresponding block boundary steps.

14. The method according to claim 1, wherein the processing further comprises the step of:
    calculating, as a total ratio, a ratio for each of the classes relative to the pixels of the entire image, wherein when the total ratio is smaller than another predetermined threshold that is smaller than the predetermined threshold, the boundary ratio calculating means suspends the calculation of the total ratio of a larger class of a corresponding step than the class.

15. A non-transitory computer readable medium storing a program for causing a computer to execute processing comprising the steps of:

calculating a step of each pixel in an image, the step being obtain by subtracting, from an absolute value of a difference in pixel values between the pixel and one adjacent reference pixel of the pixel, and average value of absolute values of differences in pixel values between any two in the neighborhood among the pixel and reference pixels of the pixel except for a neighborhood between the pixel and the one adjacent reference pixel or the pixel, wherein the reference pixels of the pixel are all horizontal pixels of the pixel or all vertical pixels of the pixel;

storing the step of the pixel, wherein the step of the pixel of interest is largest one among the steps of the pixel of interest and the steps of the reference pixels of the pixel of interest stored, the step of the pixel of interest is set as a block boundary step;

classifying the pixels into classes for areas of the block boundary steps;

calculating, as a boundary ratio, a ratio of the number of pixels at a block boundary for each of the classes to the number of pixels in the image for the each of the classes; and determining, as a block noise strength of the image, the block boundary step that is larger than a predetermined threshold and that is at a class having a largest value.

16. An image processing device comprising;

a step calculator configured to calculate a step of each pixel in an image, the step being obtained by subtracting, from an absolute value of a difference in pixel values between the pixel and one adjacent reference pixel of the pixel, and average value of absolute values of differences in pixel values between any two in a neighborhood among the pixel and reference pixels of the pixel except for a neighborhood between the pixel and the one adjacent reference pixel of the pixel, wherein the reference pixels of the pixel are all horizontal pixels of the pixel or all vertical pixels of the pixel, wherein the step calculating means further includes storing means for storing the step of the pixel, and when the step of the pixel of interest is a largest one among the step of the pixel of interest and the steps of the reference pixels of the pixel of interest stored by the storing means, the step calculating means sets the step of the pixel of interest as a block boundary step;

a classifier configured to classify the pixels into classes for areas of the block boundary steps;

a boundary ratio calculator configured to calculate, as a boundary ratio, a ratio of the number of pixels at a block boundary for each of the classes to the number of pixels in the image for the each of the classes; and a block noise strength determinator configured to determine, as a block noise strength of the image, the block boundary step that is larger than a predetermined threshold and that is at a class having a largest value.

17. The image processing device according to claim 16, further comprising a stabilizer configured to correct and stabilize, when the image is a moving image, the block noise strength of a current image containing a pixel of interest in accordance with a block noise strength of an image that is close in time.

18. The image processing device according to claim 16, wherein the step calculator further includes a storage configured to store multiple pieces of information of values of the differences of the pixels of interest, wherein when the difference value of the pixel of interest is a largest one of the difference values of the pixels of interest, the difference values being stored by the storage, the step calculator sets the difference value of the pixel of interest as the step of the pixel of interest.

19. The image processing device according to claim 16, wherein the step calculator changes the reference pixel on a basis of a block size.

20. The image processing device according to claim 16, wherein a position of the block boundary is calculated based on information expressed by a scaling initial position and a scaling ratio for a reference block size.

21. The image processing device according to claim 16, wherein the boundary ratio calculator calculates the ratio of the number of pixels at the block boundary for each of the classes in ascending order of corresponding block boundary steps.

22. The image processing device according to claim 21, further comprising:

a total ratio calculator configured to calculate, as a total ratio, a ratio for each of the classes relative to the pixels of the entire image, wherein when the total ratio is smaller than another predetermined threshold that is smaller than the predetermined threshold, the boundary ratio calculator suspends the calculation of the total ratio of a larger class of a corresponding step than the class.

* * * * *